US010885509B2

(12) United States Patent
Chen et al.

(10) Patent No.: US 10,885,509 B2
(45) Date of Patent: Jan. 5, 2021

(54) BRIDGE DEVICE FOR LINKING WIRELESS PROTOCOLS

(71) Applicant: Visa International Service Association, San Francisco, CA (US)

(72) Inventors: Yuexi Chen, Foster City, CA (US); Mustafa Top, San Ramon, CA (US); Philippe Martin, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 542 days.

(21) Appl. No.: 14/884,380

(22) Filed: Oct. 15, 2015

(65) Prior Publication Data

US 2017/0109726 A1   Apr. 20, 2017

(51) Int. Cl.
  *G06Q 20/10* (2012.01)
  *G06Q 20/32* (2012.01)
  *H04W 88/16* (2009.01)

(52) U.S. Cl.
  CPC ......... *G06Q 20/3227* (2013.01); *G06Q 20/10* (2013.01); *H04W 88/16* (2013.01)

(58) Field of Classification Search
  CPC .................................................. G06F 3/0237
  See application file for complete search history.

(56) References Cited

U.S. PATENT DOCUMENTS

| 5,991,410 A | * | 11/1999 | Albert | ................ | G06Q 20/0855 380/270 |
| 7,194,544 B2 | * | 3/2007 | Natarajan | ................ | H04L 29/06 709/201 |
| 8,820,627 B2 | | 9/2014 | Shenker | | |
| 9,717,108 B2 | * | 7/2017 | Raj | ................ | H04L 67/12 |
| 2002/0109580 A1 | * | 8/2002 | Shreve | ................ | G07C 9/00103 340/5.61 |
| 2002/0160790 A1 | * | 10/2002 | Schwartz | ................ | G06F 3/0237 455/456.1 |
| 2003/0218066 A1 | | 11/2003 | Fernandes | | |
| 2004/0266439 A1 | * | 12/2004 | Lynch, Jr. | ................ | H04W 4/21 455/444 |

(Continued)

FOREIGN PATENT DOCUMENTS

CN              204331926 U         5/2015

*Primary Examiner* — William J Jacob
(74) *Attorney, Agent, or Firm* — Kilpatrick Townsend & Stockton

(57) ABSTRACT

A bridge device acts as a link between generic wireless protocols of mobile devices and available communication components of access devices. The bridge device can be an attachment to existing access devices and enables a transaction using any available communication components on an access device and a bridge device mobile application on a mobile device. The bridge device notifies the mobile device which communication components are available for the transaction. The mobile device then sends a selection of a communication component to the bridge device. To conduct the transaction, the bridge device converts data received from the mobile device and sends it to the access device using a protocol compatible with the selected communication component. The bridge device also converts data received from the access device and sends it to the mobile device using a generic wireless protocol supported by the mobile device.

24 Claims, 10 Drawing Sheets

(56) References Cited

U.S. PATENT DOCUMENTS

| | | | |
|---|---|---|---|
| 2005/0247797 A1* | 11/2005 | Ramachandran | G06K 19/08 235/492 |
| 2006/0006226 A1* | 1/2006 | Fitzgerald | G06Q 20/10 235/380 |
| 2007/0183449 A1* | 8/2007 | Beagley | H04W 4/18 370/466 |
| 2008/0013569 A1* | 1/2008 | Boren | H04L 12/66 370/466 |
| 2009/0112768 A1* | 4/2009 | Hammad | G06Q 10/087 705/44 |
| 2011/0068171 A1* | 3/2011 | Hsieh | G06K 7/0004 235/380 |
| 2011/0078081 A1* | 3/2011 | Pirzadeh | G06Q 20/20 705/44 |
| 2011/0238726 A1* | 9/2011 | Klein | G06Q 30/04 709/202 |
| 2012/0143707 A1* | 6/2012 | Jain | G06Q 20/20 705/18 |
| 2012/0203610 A1 | 8/2012 | Grigg | |
| 2013/0091288 A1* | 4/2013 | Shalunov | H04W 8/005 709/227 |
| 2013/0262856 A1* | 10/2013 | Moshfeghi | H04L 9/3271 713/155 |
| 2013/0282589 A1* | 10/2013 | Shoup | G06F 21/34 705/67 |
| 2014/0057559 A1* | 2/2014 | Smith | H04B 5/0037 455/41.1 |
| 2014/0074722 A1 | 3/2014 | Abel | |
| 2014/0287685 A1* | 9/2014 | Griffin | H04W 12/02 455/41.2 |
| 2015/0118958 A1* | 4/2015 | Jain | G06Q 20/204 455/41.1 |
| 2015/0186871 A1* | 7/2015 | Laracey | G06Q 20/3278 705/41 |
| 2015/0373762 A1* | 12/2015 | Raj | H04L 67/12 370/329 |
| 2016/0191461 A1* | 6/2016 | Wang | H04L 65/103 709/227 |

* cited by examiner

BRIDGE DEVICE FOR LINKING WIRELESS PROTOCOLS

CROSS-REFERENCES TO RELATED APPLICATIONS

None.

BACKGROUND

Typically, when a user conducts a transaction at a terminal, the user can utilize their mobile device at an access device, which may receive information from the mobile device. For example, the user may conduct a payment transaction at the terminal in which the user utilizes their payment device at the access device.

Traditionally, such access devices utilized for transactions are limited to three payment technologies including contactless, contact, and magnetic stripe communication components. However, not all access devices support the same technologies, which can limit mobile payments. For example, while most access devices are expected to support a magnetic stripe communication component, there is a lesser degree of availability of support for a contact communication component and a contactless communication component. Additionally, each communication component may require different specifications.

Further, such mobile devices utilized for transactions are typically required to support contactless technology (e.g., near-field communications (NFC)) to communicate with the contactless communication component of the access device. Yet, not all mobile devices support contactless technology. Additionally, even for mobile devices that do support contactless technology, it may not be possible to conduct transactions with access devices that only support a magnetic stripe communication component or a contact communication component. This further limits mobile payments.

While the above-described transaction processes can be used, a number of improvements could be made.

Thus, new and enhanced methods for conducting transactions between mobile devices and access devices is needed. Embodiments of the invention address these and other problems, individually and collectively.

BRIEF SUMMARY

Embodiments of the invention are directed to systems and methods related a bridge device that for bridging a mobile device and an access device in a transaction. In some cases, the bridge device may be attached to an existing access device. The bridge device may enable mobile transactions to be conducted without being limited by the availability of certain communication components of the access device and wireless capabilities supported by the mobile device.

One embodiment of the invention is directed to a bridge device comprising a processor, an antenna coupled to the processor, and a computer-readable medium coupled to the processor. The computer-readable medium can comprise code, executable by the processor, for performing a method. The method can comprise establishing a wireless connection with a mobile device of a user conducting a transaction and determining one or more available communication components of an access device. In some cases, the wireless connection can be a local area wireless network connection or a short-range wireless connection (e.g., Wi-Fi™, Bluetooth®, etc.). The method can further comprise notifying, over the wireless connection, the mobile device of the one or more available communication components, receiving, from the mobile device over the wireless connection, a response including a selection of a first communication component from the one or more available communication components, and communicating the selection to the access device. The method can further comprise detecting that the first communication component of the access device is activated before initiating the transaction.

In some embodiments, the one or more available communication components include a magnetic stripe component, a contact component, and a contactless component. In some cases, the one or more available communication components may be registered in a priority order by bridge device.

The method further comprises sending, to the mobile device over the wireless connection, a request to initiate a transaction using the first communication component and receiving, from the mobile device over the wireless connection, a message including transaction data for conducting the transaction using the first communication component. The method further comprises converting the message including the transaction data to be compatible with the first communication component and providing the converted message including the transaction data to the access device, wherein the access device transmits an authorization request including the transaction data to a server computer for authorization.

In some embodiments, a connector is in the bridge device for attaching the bridge device to the access device. The connector can comprise one or more connectors including a magnetic component connector, a contact component connector, or a contactless component connector for connecting to communication components of the access device.

In some embodiments, the method can further comprise detecting that the mobile device is in range of the bridge device and receiving, from the mobile device, an indication that the mobile device is capable of conducting transaction with the bridge device. For example, the indication may show that the mobile device is running a bridge device mobile application.

In some embodiments, the mobile device may request to switch the communication component utilized for the transaction. For example, the method can further comprise receiving a request from the mobile device to utilize a second communication component instead of the first communication component for the transaction, sending a notification to the access device to switch communications components, and conducting the transaction using the second communication component.

These and other embodiments of the invention are described in further detail below.

DETAILED DESCRIPTION

Figure 1:
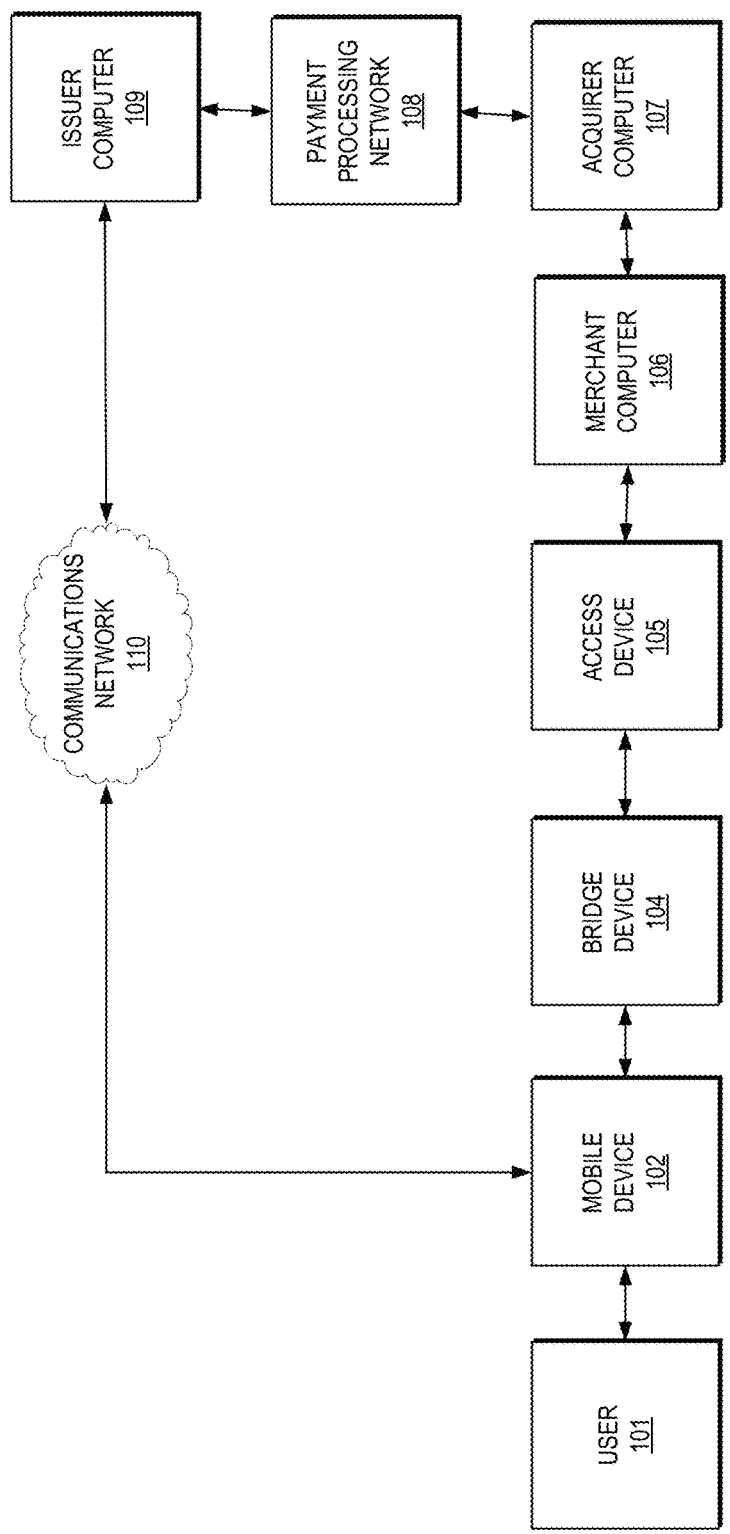
FIG. 1 shows a block diagram of an exemplary system according to embodiments of the invention.

Embodiments of the present invention are directed to systems, methods, apparatuses, and computer readable media for enabling a bridge device that can link wireless protocols between a mobile device and an access device for a transaction. The bridge device can be attached to an existing access device and may communicate with various communication components (e.g., magnetic-stripe component, contact component, contactless component) within the access device.

The bridge device can use generic wireless protocols that are supported by a mobile device. For example, the bridge device can establish communication with the mobile device by a generic wireless protocol, such as Bluetooth® or Wi-Fi™. The bridge device may then activate one of the available communication components of the access device and relay communication to the access device via the selected communication component. The bridge device is capable of converting commands and responses in real time when applicable. A mobile application may reside in the mobile device to push applicable data by the generic wireless protocol when bridge device contactless communication (e.g., NFC) cannot be established between the access device and the mobile device. In some cases, the mobile application may be a bridge device mobile application.

The bridge device may receive commands from the access device in real time from the activated communication component of the access device, extract application layer commands, and send by a wireless protocol (e.g., Bluetooth®, Wi-Fi™) the extracted commands to the payment application residing on the mobile device. Once the command is received by the payment application, a response may be sent back to the bridge device by the wireless protocol (e.g., Bluetooth®, Wi-Fi™). The bridge device may then convert response data and send the converted data to the active communication component in the access device. In some cases, if the contact or contactless components are not available, the bridge device may instead utilize the magnetic-stripe component to send data. Such data can be extracted from the communication originating from the payment application residing in the mobile handset. In some embodiments, the communication component to activate can be selected by the mobile device or the access device.

The bridge device is useful because it can help solve several issues in current systems utilizing access devices for transactions. In next generation payment systems, it is expected that payment applications may be independent of underlying communication protocols (e.g., related to Level 1 Data, which may include cardholder information, transaction amount, transaction date, currency code, currency conversion, merchant name, etc.) and instead utilize generic wireless protocols (e.g., Bluetooth®, Wi-Fi™). However, current terminals with access devices do not support communication by such generic wireless protocols and further do not all support the same communication components for conducting transactions. Additionally, mobile devices do not all have contactless technology (e.g., NFC) to utilize with access devices. Further, for mobile devices that do utilize contactless technology, transactions can come with fees by third parties, such as phone manufacturers and telco companies. These various factors can limit mobile transactions that can be accepted by current systems. Further, changing the existing terminal infrastructure is costly and inefficient.

The bridge device can solve these issues by expanding compatible payment methods between mobile devices and access devices. The bridge device may be capable of being adapted to existing terminals and thus enable reuse of existing payment terminals. The bridge device can increase the acceptance of mobile payments between mobile devices and access devices, while protecting security measures for transactions, by enabling a "virtual card" inside a mobile application on a user mobile device and instance issuance over-the-air. The bridge device can reduce the chances of a fragmented user experience and remove barriers from mobile device manufacturers and mobile operators that may not desire to alter existing hardware for business or technical reasons.

Prior to discussing embodiments of the invention, description of some terms may be helpful in understanding embodiments of the invention.

A "communication component" may be a combination of hardware and software that enables an access device to communicate with another device for a transaction. A communication component may also be known as an interface (e.g., payment interface). In some embodiments, various communication components may be specialized for a specific payment type. For example, one communication component may be a magnetic stripe component specifically for use in a magnetic stripe transaction, another communication component may be a contactless component specifically for use in a contact transaction, and another communication component may be a contactless component specifically for use in a contactless transaction.

A "bridge device mobile application" may be a mobile application that enables a mobile device to conduct a transaction involving a bridge device. For example, the bridge device may not initiate a transaction with a mobile device if it does not indicate that it runs the bridge device mobile application. The bridge device mobile application may provide may conduct a handling process using generic wireless protocols for the transaction. It can further recognize specific instructions transferred by an active RF link, Bluetooth®, Wi-Fi™, or NFC Forum peer-to-peer. The bridge device mobile application may be able to process instructions for conducting magnetic stripe, contact, or contactless transactions with the bridge device and access device.

An "authorization request message" may be an electronic message that is sent to a payment processing network and/or an issuer of a payment account to request authorization for a payment transaction. An authorization request message according to some embodiments may comply with ISO (International Organization for Standardization) 8583, which is a standard for systems that exchange electronic transaction information associated with a payment made by a consumer using a payment device or a payment account. An authorization request message may also comprise additional data elements corresponding to "identification information" including, for example, a service code, a CVV (card verification value), a dCVV (dynamic card verification value), an expiration date, etc. An authorization request message may also comprise "transaction data," such as any information associated with a current transaction (e.g., the transaction amount, merchant identifier, merchant location, etc.) as well as any other information that may be utilized in determining whether to identify and/or authorize a payment transaction.

An "authorization response message" may be an electronic message reply to an authorization request message generated by an issuing financial institution (i.e. issuer) or a payment processing network. The authorization response message may include an authorization code, which may be a code that an account issuing bank returns in response to an authorization request message in an electronic message (either directly or through the payment processing network) to a merchant's access device (e.g., point of sale terminal) that indicates approval of the transaction. The code may serve as proof of authorization. As noted above, in some embodiments, a payment processing network may generate and/or forward the authorization response message to the merchant.

A "server computer" may typically be a powerful computer or cluster of computers. For example, the server computer can be a large mainframe, a minicomputer cluster, or a group of servers functioning as a unit. The server computer may be associated with an entity such as a payment processing network, a merchant, an authentication cloud, an acquirer, or an issuer.

An "authorization computer" can include any system involved in authorization of a transaction. The authorization computer may determine whether a transaction can be authorized and may generate an authorization response message including an authorization status (also may be known as an authorization decision). In some embodiments, an authorization computer may be a payment account issuer computer. In some cases, the authorization computer may store contact information of one or more users. In other embodiments, the authorization computer may authorize non-financial transactions involving a user. For example, the authorization computer may make an authorization decision regarding whether the user can access a certain resource (e.g., an electronic document).

A "resource providing entity" may be an entity that may make resources available to a user. Examples of resource providing entities include merchants, vendors, suppliers, owners, traders, and the like. In some embodiments, such entities may be a single individual, small groups of individuals, or larger groups of individuals (e.g., companies). Resource providing entities may be associated with one or more physical locations (e.g., supermarkets, malls, stores, etc.) and online platforms (e.g., e-commerce websites, online companies, etc.). At the physical locations, the resource providing entity may host an access device for conducting transactions with a user's payment device. In some embodiments, resource providing entities may make available physical items (e.g., goods, products, etc.) to the user. In other embodiments, resource providing entities may make available digital resources (e.g., electronic documents, electronic files, etc.) to the user. In other embodiments, resource providing entities may manage access to certain resources by the user.

A "computing device" may be any suitable electronic device that can process and communicate information to other electronic devices. The computing device may include a processor and a computer readable medium coupled to the processor, the computer readable medium comprising code, executable by the processor. The computing device may also each include an external communication interface for communicating with each other and other entities. A mobile device, a cardholder device, a user device, a consumer device, a server computing device, and any computer may be exemplary types of computing devices.

"Transaction data" may refer to any data or information surrounding or related to a transaction. For example, transaction data may include transaction details and any data associated with the transaction that may be utilized by entities involved in the transaction process. For instance, the transaction data may include information useful for processing and/or verifying the transaction (e.g., account identifiers, tokens, account parameters, etc.). Transaction data may also include any data or information surrounding or related to any participants partaking in or associated with the transaction. Example transaction data may include a transaction amount, transaction location, resources received (e.g., products, documents, etc.), information about the resources received (e.g., size, amount, type, etc.), resource providing entity data (e.g., merchant data, document owner data, etc.), user data, date and time of a transaction, payment method, and other relevant information.

I. Exemplary Systems and Methods

FIG. 1 shows a block diagram of a system 100 according to an embodiment of the invention. The system 100 is for conducting a transaction involving a bridge device that can link wireless protocols. The system 100 includes a user 101. It also includes a mobile device 102 that is operated by the user 101, a bridge device 104, an access device 105, a merchant computer 106, an acquirer computer 107, a payment processing network 108, an issuer computer 109, and a communications network 110. The mobile device 102, the bridge device 104, the access device 105, the merchant computer 106, the acquirer computer 107, the payment processing network 108, and the issuer computer 109 may be in operative communication with each other.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications protocol.

User 101 (which may alternatively be referred to as a consumer) may operate mobile device 102 to conduct a transaction. User 101 may enter information into mobile device 102. For example, user 101 may enter data by interacting with a mobile application interface displayed on mobile device 102 and the data may be sent to another entity, such as bridge device 104 or access device 105. In other cases, user 101 may enable mobile device 102 to interact with access device 105 by any suitable method (e.g., swiping, dipping, etc.). In some cases, user 101 may allow their mobile device 102 to communicate with access device 105 by a generic wireless protocol.

Mobile device 102 may be in any suitable form. For example, a suitable mobile device 102 can be hand-held and compact so that it can fit into a consumer's pocket (e.g., pocket-sized). Mobile device 102 can include a processor, a memory, input devices, and output devices, operatively coupled to the processor. Some non-limiting examples of mobile device 102 may include mobile devices (e.g., cellular phones, keychain devices, personal digital assistants (PDAs), pagers, notebooks, laptops, notepads, wearable devices (e.g., smart watches, fitness bands, jewelry, etc.), automobiles with remote communication capabilities, personal computers, payment cards (e.g., smart cards, magnetic stripe cards, etc.), and the like. Mobile device 102 may be associated with a consumer or a user, such as user 101.

Figure 5:
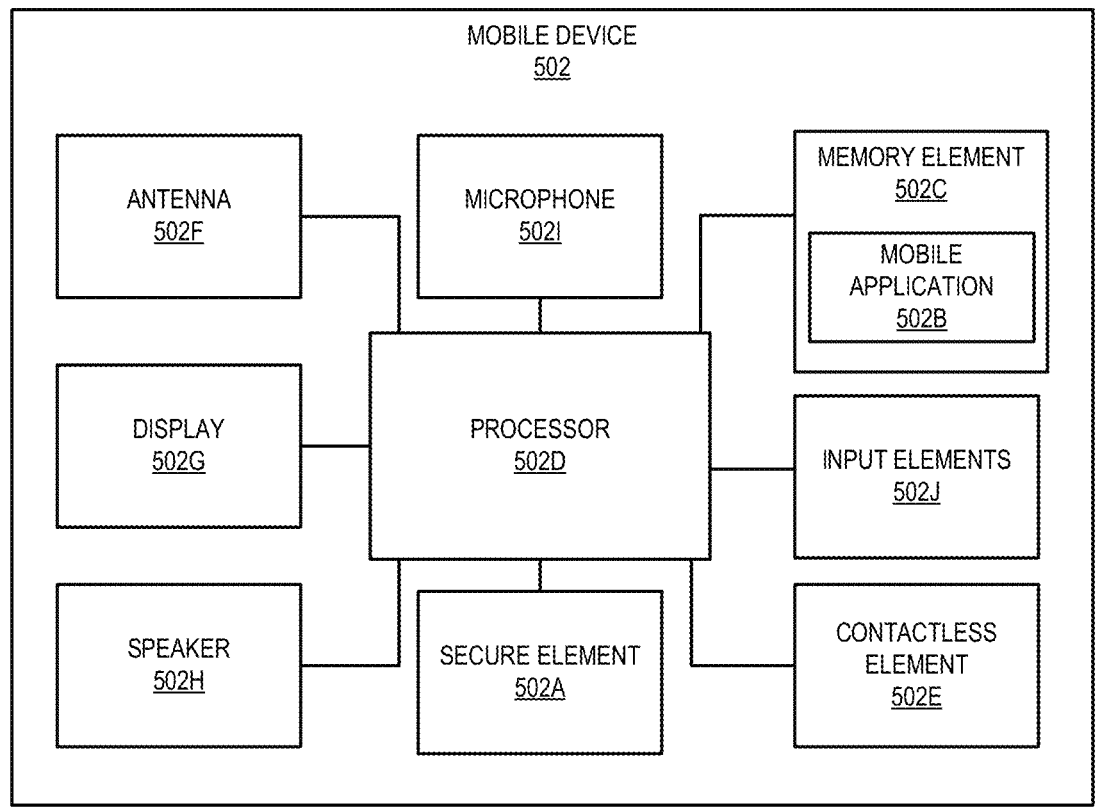
FIG. 5 shows a block diagram of a mobile device according to embodiments of the invention.

In some embodiments, mobile device 102 may include a mobile application (e.g., payment application, wallet application, etc.) stored in a memory or secure element of mobile device 102. In other embodiments, the mobile application may be a bridge device application (e.g., issued by issuer computer 109) for enabling transactions involving a bridge device, such as bridge device 104. In some cases, the mobile application may communicate information to and from issuer computer 109 over communications network 110. FIG. 5 describes various components of an exemplary mobile device and functionality of the mobile application in further detail.

Bridge device 104 may enable a transaction between mobile device 102 and access device 105. For communication with access device 105, bridge device 104 may include a connector that enables bridge device 104 to attach and communicate data to and from access device 105. In some embodiments, bridge device 104 may utilize the connector to activate communication components in access device 105, which may include a magnetic stripe component, a contact component, and a contactless component. Bridge device 104 may simulate magnetic stripe, contact chip, and contactless chip signals to send to the magnetic stripe component, the contact component, and the contactless component, respectively. Bridge device 104 may be compatible with existing payment terminals, which may enable transparency to existing terminal software and back end processing networks.

Bridge device 104 may also enable handling of commands and responses from the mobile application on mobile device 102. Bridge device 104 may be connected to mobile device 102 by a wireless protocol supported by mobile device 102, such as Wi-Fi™ or Bluetooth®. Data received from the mobile application using the wireless protocol may be translated by bridge device 104 and sent to an active communication component of access device 105. Access to bridge device 104 may be protected (e.g., limited to mobile devices with bridge device application) and the connection to bridge device 104 secured (e.g., by use of generic wireless protocol). In some embodiments, bridge device 104 may employ minimal conversion functions to reduce complex circuitry and advanced security architecture, which can be cost effective. Further detailed description of bridge device 104 can be found at least in descriptions for FIG. 4 and FIG. 6.

Access device 105 may be in any suitable form. In some embodiments, access device 105 can be a device that can interact with mobile device 102 during a purchase transaction or for other types of interactions (e.g., money, transfers, top-ups or to obtain account details, etc.). In some cases, access device 105 may be hosted by a resource providing entity and may be a merchant access device. Some non-limiting examples of access device 105 may include merchant devices, point of sale (POS) terminals or devices, cellular phones, PDAs, personal computers (PCs), tablet PCs, handheld specialized readers, set-top boxes, electronic cash registers, automated teller machines (ATMs), virtual cash registers, kiosks, security systems, access systems, and the like.

Access device 105 may use any suitable contact or contactless mode of operation to send or receive data from, or associated with, mobile device 102. For example, access device 105 can include radio frequency (RF) antennas, contact chip readers, magnetic stripe readers, or other means to interact with the mobile device 102. Even if bridge device 104 is connected to access device 105 for communication with a mobile phone or the like, access device 105 may still be able to handle payments conducted with a payment card. In some embodiments, access device 105 may be associated with a merchant.

Merchant computer 106 may be a server computer operated by a merchant. Merchant computer 106 may be in communication with and receive data from access device 105. For example, merchant computer 106 may process messages from access device 105 and relay them to acquirer computer 107.

Acquirer computer 107 is typically a system for an entity (e.g. a bank) that has a business relationship with a particular merchant, a wallet provider, or other entity. Acquirer computer 107 may be communicatively coupled to a merchant computer and payment processing network 108 and may issue and manage an account of a merchant.

Payment processing network 108 may include data processing subsystems, networks, and operations used to support and deliver authorization services, and clearing and settlement services. For example, payment processing network 108 may comprise a server computer, coupled to a network interface, and a database of information. Payment processing network 108 may include wired or wireless network, including the internet. An example of payment processing network 108 includes VisaNet®, operated by Visa®. Payment processing networks such as VisaNet™ are able to process credit card transactions, debit card transactions, and other types of commercial transactions. VisaNet™, in particular, includes a VIP system (Visa Integrated Payments system), which processes authorization requests and a Base II system which performs clearing and settlement services.

Issuer computer 109 may be operated by an account issuer. Issuer computer 109 may also be known as an authorization computer. Typically, the issuer is a business entity (e.g. a bank) which maintains financial accounts (e.g., credit card account, checking account, savings account, merchant account, prepaid account, etc.) for the consumer and often issues a payment device, such as a credit, debit, prepaid, or other card, to the cardholder. Some entities can perform both issuer computer and acquirer computer functions. Embodiments of the invention encompass such single entity issuer-acquirers. Issuer computer 109 may be an example of an authorization computer and may determine whether a transaction can be authorized.

Communications network 110 may enable communication between devices. A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Any of the devices described herein (e.g., mobile device 102, bridge device 104, access device 105, merchant computer 106, acquirer computer 107, payment processing network 108, issuer computer 109, etc.) may be a computing device. Server computers may be computing devices.

Figure 2:
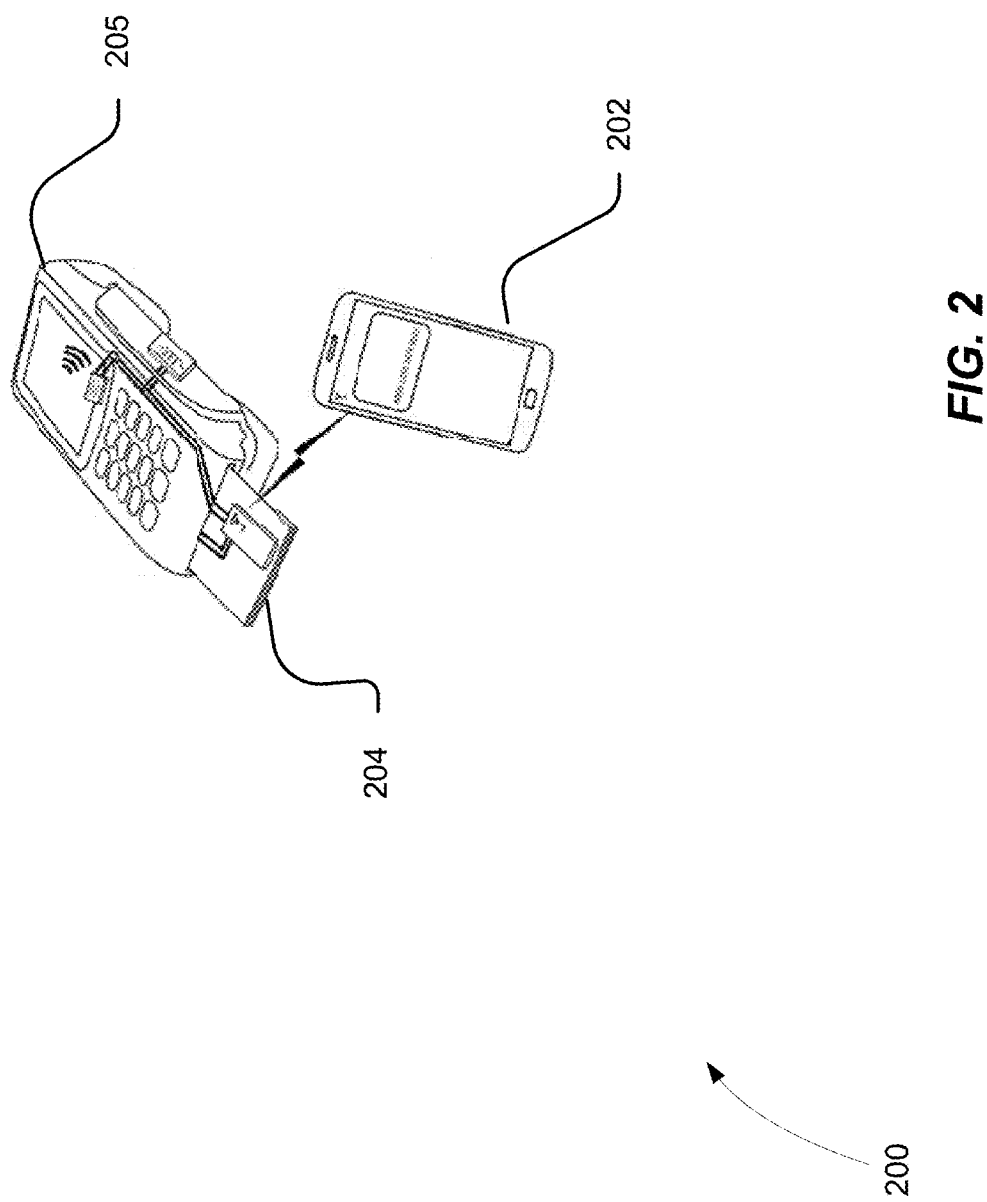
FIG. 2 shows an exemplary system using a bridge device according to embodiments of the invention.

FIG. 2 depicts an exemplary system 200 using a bridge device 204 according to embodiments of the invention. The bridge device 204 is attached to an access device 205 such that bridge device 204 can communicate data to and from communication components of access device 205. In some cases, as shown, bridge device 204 may be connected to access device 205 by being inserted into an existing slot (e.g., a slot cooperatively structured to receive a thin dimension of a payment card) in access device 205. However, any suitable method can be utilized to connect bridge device 204 and access device 205. For example, bridge device 204 and access device 205 may be connected by one or more suitable cables.

Bridge device 204 may also communicate wirelessly with mobile device 202. For example, bridge device 204 may establish a wireless connection (e.g., by Bluetooth®—both classic, and BLE or Bluetooth® low energy, Wi-Fi™, etc.) with mobile device 202. Mobile device 202 and bridge device 204 may transfer data over the established connection.

Figure 3:
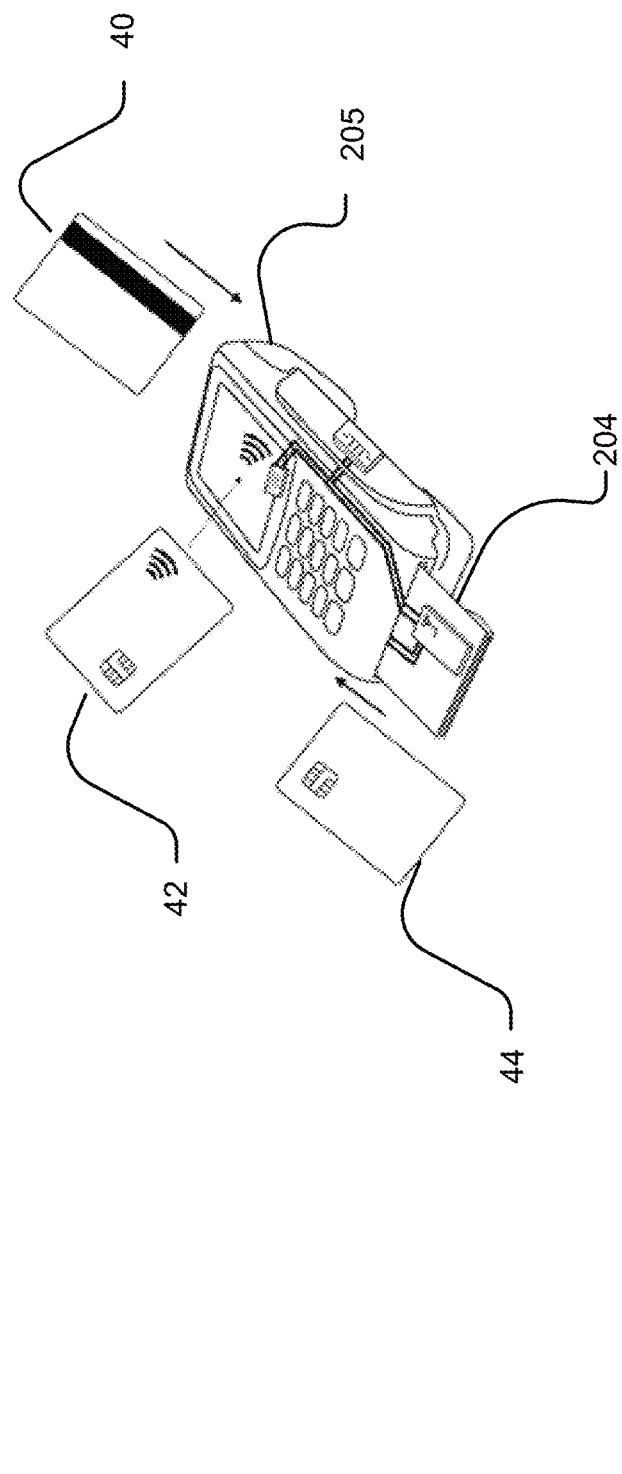
FIG. 3 shows an exemplary system using a bridge device according to embodiments of the invention.

FIG. 3 depicts an exemplary system 300 using bridge device 204 according to embodiments of the invention. Although bridge device 204 is attached to access device 205, access device 205 may still be usable by its conventional uses. For example, mobile devices 40, 42, and 44 may be payment cards that can be utilized for magnetic stripe, contactless, or contact transactions to conduct transactions directly with access device 205, without communication with bridge device 204. Hence, bridge device 204 advantageously does not impede already existing uses of access device 205.

Figure 4:
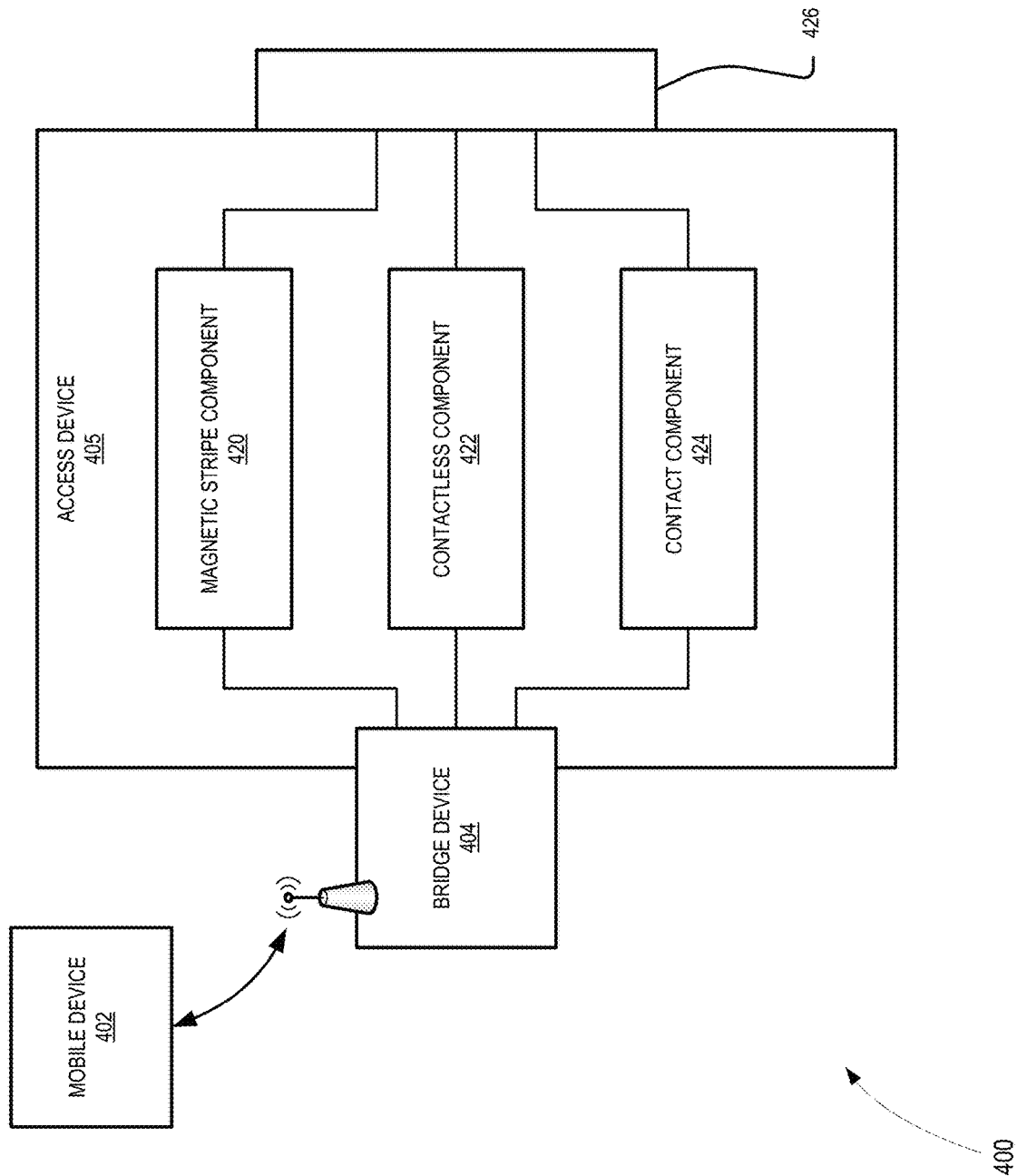
FIG. 4 shows a block diagram of an exemplary system using a bridge device according to embodiments of the invention.

FIG. 4 shows a block diagram 400 of an exemplary system using a bridge device according to embodiments of the invention. FIG. 4 includes a mobile device 402, a bridge device 404, and an access device 405 including magnetic stripe component 420, contactless component 422, contact component 424, and network interface 426.

Mobile device 402 may be any suitable device with wireless communication capabilities. For example, mobile device 402 may be a mobile phone operated by a user that has a mobile application that can be utilized to conduct transactions. The mobile application may be a bridge device mobile application that enables transactions involving bridge devices, such as bridge device 404. Mobile device 402 may communicate with bridge device 404 by a suitable wireless protocol (e.g., Wi-Fi™, Bluetooth®, NFC peer-to-peer).

Bridge device 404 may be attached to access device 405 and be capable of communicating data to and from mobile device 402 and access device 405. Bridge device 404 may include one or more connectors that can interface with magnetic stripe component 420, contactless component 422, and contact component 424 of access device 405. In some embodiments, each connector corresponding to an available communication component may be attached to access device 405.

In some embodiments, bridge device 404 may have appropriate components (e.g., sockets) compatible with direct use with a payment device based on known payment standards. For example, bridge device 404 may fit into a contact card slot in access device 405. If this is the case, bridge device 404 may also comprise a slot for receiving a payment device (e.g., a payment card). Thus, installation of bridge device 404 may not impede contact transactions to be conducted with access device 405.

Since each connector of bridge device 404 attached to a communication component of access device 405 can enable payment devices to directly communicate to the communication component, there is minimal to no interference from bridge device 404 on the communication. For example, when a contactless payment device (e.g., EMV (Europay, Mastercard, Visa) contactless card, mobile phone, etc.) communicates with contactless component 422 of access device 405, bridge device 404, serving as an intermediary between the payment device and access device 405, may have minimal to no effect on the direct communication. The same minimal to no effect applies for communication to contact component 424 and magnetic stripe component 420 as well.

Bridge device 404 may support wireless protocols such as Wi-Fi™ and Bluetooth®. In some cases, bridge device 404 may support protocol for NFC Forum peer-to-peer mode. Bridge device 404 may transmit raw payment data packages received from mobile device 402 to an active communication component of access device 405. The data packages may be extracted from protocol frames of wireless protocols supported by mobile device 402 and relayed to the communication component of access device 405. In some embodiments, the data packages may include transaction data, which may include account identifiers, tokens, additional account parameters, and other information surrounding the transaction. Bridge device 404 may be capable of converting commands and responses between mobile device 402 and access device 405 in real time when applicable. Further details description of bridge device functionality is described with respect to FIG. 6.

Access device 405 may be any suitable device that can be utilized for a transaction and may have similar features at least to those of access device 105 of FIG. 1. Access device 405 may be utilized in typical contact, contactless and magnetic stripe transactions and may have an area in which bridge device 404 may attach to access device 405. When a transaction utilizing a communication component of access device 405 is being conducted, access device 405 may activate the communication component by powering it on and enabling it to receive and transmit data. Access device 405 may comprise magnetic stripe component 420, contactless component 422, contact component 424, and network interface 426.

Magnetic stripe component 420 may be any suitable combination of hardware and software that enables a magnetic stripe transaction. For example, magnetic stripe component 420 may include a magnetic read head for reading data from cards, as well as one or more software modules for processing the data. Magnetic stripe component 420 may be activated by access device 405 when a magnetic stripe transaction is to be conducted. In some embodiments, magnetic stripe component 420 may communicate data to and from bridge device 404 adhering to signal attributes defined in ISO/IEC 7811 standards, as well as proprietary functions.

Contactless component 422 may be any suitable combination of hardware and software that enables a contactless transaction. For example, contactless component 422 may include a contactless element (which may include an antenna) for reading data by wireless communication (RF, IR, etc.), as well as one or more software modules for processing the data. Contactless component 422 may be activated by access device 405 when a contactless transaction is to be conducted. In some embodiments, contactless component 422 may communicate data to and from bridge device 404 adhering to EMV contactless communication protocol (CCP) and ISO/IEC 14443 transmission protocols.

Contact component 424 may be any suitable combination of hardware and software that enables a contact transaction. For example, contact component 424 may include a chip reader for supplying power to and reading data from cards, as well as one or more software modules for processing the data. Contact component 424 may be activated by access device 405 when a contact transaction is to be conducted. In some embodiments, contact component 424 may communicate data to and from bridge device 404 adhering to contact specifications (e.g., related to Level 1 Data, which may include cardholder information, transaction amount, transaction date, currency code, currency conversion, merchant name, etc.) and ISO/IEC 7816 transmission protocols.

Contact component 424 may be capable of communicating with a contact card with T=0 or T=1 communication protocols, adhering to EMV (Europay, Mastercard, Visa) specifications. In some embodiments, the T=1 communication protocol may be set as a default protocol in which data is sent in blocks. Typically, the T=1 communication protocol is suited for delayed communications in which data is extracted before it is transferred. In contrast, the T=0 communication protocol may send commands and responses in smaller pieces, which can be restrictive for certain commands (e.g., non-EMV). Further, time extension requests can be more complex to manage for the T=0 communication protocol, since real time processing is applied instead of conducting an extracting process prior to a transmission process as in the T=1 communication protocol. However, the T=0 communication protocol can still be utilized to conduct a transaction involving bridge device 404.

Network interface 426 may be any suitable combination of hardware and software that enables data to be transferred to and from access device 405. In some cases, network interface 426 may enable access device 405 to send transaction data, such as an authorization request message, to devices residing at remote locations, such as at an issuer, acquirer, merchant, and payment processing network. Some examples of network interface 426 may include a modem, a physical network interface (such as an Ethernet card or other Network Interface Card (NIC)), a virtual network interface, a communications port, a Personal Computer Memory Card International Association (PCMCIA) slot and card, or the like.

Data transferred via network interface 426 may be in the form of signals which may be electrical, electromagnetic, optical, or any other signal capable of being received by the external communications interface (collectively referred to as "electronic signals" or "electronic messages"). These electronic messages that may comprise data or instructions may be provided between network interface 426 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

FIG. 5 depicts a block diagram of an exemplary mobile device 502. FIG. 5 shows a number of components, and mobile device 502 according to embodiments of the invention may comprise any suitable combination or subset of such components.

Mobile device 502 may include a processor 502D (e.g., a microprocessor) for processing functions of mobile device 502. One exemplary function enabled by processor 502D includes processing functions of display 502G to allow a consumer to see information (e.g., interfaces, contact information, messages, etc.). Processor 502D may include hardware within mobile device 502 that can carry out instructions embodied as code in a computer-readable medium.

An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

Mobile device 502 may comprise a secure element 502A. Secure element 502A may be a secure memory on mobile device 502 such that the data contained on secure element 502A cannot easily be hacked, cracked, or obtained by an unauthorized entity. Secure element 502A may be utilized by mobile device 502 to host and store data and applications that may require a high degree of security. Secure element 502A may be provided to mobile device 502 by a secure element issuer. Secure element 502A may be either embedded in the handset of mobile device 502 or in a subscriber identity module (SIM) card that may be removable from mobile device 502. Secure element 502A can also be included in an add-on device such as a micro-Secure Digital (micro-SD) card or other portable storage device.

Secure element 502A may store any suitable sensitive information. For example, secure element 502A may store financial information, bank account information, account (e.g., credit, debit, prepaid) number information, payment tokens associated with such account number information, account balance information, expiration dates, and verification values (e.g., CVVs, dCVVs, etc.). Other information that may be stored in secure element 502A may include consumer information or user data (e.g., name, date of birth, contact information, etc.). In other embodiments, some, none, or all of the foregoing information may be stored in memory element 502C or may be stored at a remote server computer (e.g., in the cloud).

Mobile device 502 may comprise a memory element 502C (e.g., computer readable medium). Memory element 502C may be present within a body of mobile device 502 or may be detachable from the body of mobile device 502. The body of mobile device 502 may be in the form of a plastic substrate, housing, or other structure. Memory element 502C may store data (e.g., applications, etc.) and may be in any suitable form (e.g., a magnetic stripe, a memory chip, etc.).

Memory element 502C may comprise a mobile application 502B. Mobile application 502B may be computer code or other data stored on a computer readable medium (e.g. memory element 502C or secure element 502A) that may be executable by processor 502D to complete a task (e.g., provide a service). Mobile application 502B may be an application that operates on mobile device 502 and that may provide a user interface for user interaction (e.g., to enter and view information).

In some cases, mobile application 502B may be a payment application. Mobile application 502B may communicate with a wallet provider server computer to retrieve and return information during processing of any of a number of services offered to the user via mobile device 502 (e.g., provisioning accounts to a wallet application stored on mobile device 502).

In some embodiments, mobile application 502B may be a bridge device mobile application. For example, mobile application 502B may be issued by an issuer and may be capable of handling transactions involving communication with a bridge device. When mobile device 502 establishes a wireless connection by a generic wireless protocol (e.g., via Bluetooth®, Wi-Fi™, NFC peer-to-peer, etc.) with the bridge device, mobile application 502B may be able to recognize that the transaction to be conducted is not a regular contactless payment and thus will carry out a specialized handling process using the wireless protocol. Mobile application 502B may send an indication to the bridge device that mobile device 502 is capable of conducting transaction with the bridge device. For example, mobile application 502B may send an indication notifying the availability of the bridge device mobile application 502B on mobile device 502. In some embodiments, the indication may include an application identifier (AID), wallet identifier, or other information.

Accordingly, mobile application 502B may be able to process specific instructions transferred using the wireless protocol (e.g., from the active RF link, Bluetooth®, Wi-Fi™, NFC peer-to-peer, etc.) from the bridge device. Such instructions may contain information related to and transferred to and from active communication components (e.g., magnetic stripe component, contact component, contactless component) of an access device.

During the "discovery" process, in which mobile device 502 and the bridge device establish a wireless connection, mobile application 502B may be informed by the access device via the bridge device of which communication components are available on the access device. Mobile application 502B may then make a selection, or prompt the user to make the selection, from the available communication components and then communicate the selection to the bridge device. In some cases, the selection from the available communication components may instead be performed by the bridge device, in which case mobile application 502B may be informed, by the access device via the bridge device, of the selected communication component that is active and that communication will be relayed to during the transaction.

Based on the selected communication component, mobile application 502B may be capable of determining specific parameters related to the selected communication component. For example, mobile application 502B may request parameters associated with the communication component of the access device or may have stored some of the parameters at mobile device 502. Mobile application 502B may transmit data (e.g., Level 2 data, which may include cardholder information, transaction amount, transaction date, currency code, currency conversion, merchant name, as well as enhanced data, which may include merchant order number, sales tax information, customer reference, such as invoice number, etc.) to the bridge device, which may then relay the data to the access device using an appropriate protocol corresponding to the communication component of the access device being utilized for the transaction (e.g., T=0 or T=1 for contact adhering to ISO/IEC 7816 protocol, Type A or Type B for contactless adhering to ISO/IEC 14443 protocol). In some embodiments, the transmitted data may include an account identifier or token and additional data (e.g., a transaction cryptogram, account parameters, etc.) provisioned to mobile application 502B. Hence, depending on which communication component is active on the access device, mobile application 502B may send an appropriate response to the bridge device for readiness and for completing the transaction.

Mobile application 502B may also be capable of informing the bridge device, by sending a request at any time during a transaction, to switch the active communication component to another communication component for conducting the transaction. For example, if the transaction is not able to be successfully completed for any reason, the access device may indicate to utilize another communication component for processing the transaction. Subsequently, mobile application 502B may be capable of presenting the user of mobile device 502 with an interface that allows the user to confirm the switching communication components. Once the user confirms by any suitable interaction with the interface (e.g., activating a button, inputting a voice command, entering a personal identification number (PIN) or identifier, etc.), mobile application 502B may send a request to the bridge device to switch the active communication component to another available communication component that is indicated by the access device. In some embodiments, mobile application 502B may allow the user to initiate the switching of the communication components at any time during the transaction by presenting the interface to the user.

Mobile device 502 may further include a contactless element 502E, which may typically be implemented in the form of a semiconductor chip (or other data storage element) with an associated wireless transfer (e.g., data transmission) element, such as an antenna 502F. Contactless element 502E may be associated with (e.g., embedded within) mobile device 502. Data or control instructions transmitted via a cellular network may be applied to contactless element 502E by means of a contactless element interface (not shown). In some cases, the contactless element interface may function to permit the exchange of data and/or control instructions between the mobile device circuitry (and hence the cellular network) and optional contactless element 502E.

Contactless element 502E may be capable of transferring and receiving data using a near-field communications (NFC) capability (or NFC medium) typically in accordance with a standardized protocol or data transfer mechanism (e.g., ISO 14443/NFC). Mobile device 502 may support contactless transactions using the EMV contactless communication protocol (EMV-CCP), which is based on ISO 14443, in order to interact with merchant access devices. This capability may typically be met by implementing NFC. The NFC capability of mobile device 502 may be enabled by an embedded NFC chip or by the addition of an external memory card or accessory that contains the NFC chip. NFC capability is a short-range communications capability, such as RFID, Bluetooth®, infra-red, or other data transfer capability that can be used to exchange data between the mobile device 502 and an interrogation device. Thus, mobile device 502 may be capable of communicating and transferring data and/or control instructions via both cellular network and near-field communications capability.

Mobile device 502 may further include an antenna 502F for wireless data transfer (e.g., data transmission). Antenna 502F may be utilized by mobile device 502 to send and receive wireless communications. Antenna 502F may assist in connectivity to the Internet or other communications networks and enable data transfer functions. Antenna 502F may enable SMS, USSD, as well as other types of cellular communications, such as voice call and data communications.

Mobile device 502 may include a display 502G that may show information to a user. Display 502G may be any suitable screen that enables touch functionality. In some embodiments, display 502G of mobile device 502 may display a user interface (e.g., of a mobile application, such as mobile application 520B, or website) that may allow the user to select and interact with objects presented on display 502G. The objects may include, but may not be limited to, menus, text fields, icons, and keys/inputs on a virtual keyboard.

Mobile device 102 may include a speaker 502H, which may be any suitable device that can produce sound in response to an electrical audio signal. Speaker 502H may play recorded sounds, as well as prerecorded messages to communicate with a user. In some cases, the user may be able to receive instructions by voice communications played by speaker 502H to which the user may respond (e.g., by returning voice command, activating input elements 502J, etc.).

Mobile device 502 may include a microphone 502I, which may be any suitable device that can convert sound to an electrical signal. Microphone 502I may be utilized to capture one or more voice segments from a user. For example, microphone 502I may allow the user to transmit his or her voice to mobile device 502. In some embodiments, the user may utilize voice commands detected by microphone 502I to provide instructions to mobile device 502. In some cases, the user may provide voice commands detected by microphone 502I to navigate through mobile application 502B.

Mobile device 502 may further include input elements 502J to allow a consumer to input information into the device. Exemplary input elements 502J include hardware and software buttons, audio detection devices (e.g., microphone 502I), biometric readers, touch screens, and the like. A user may activate one or more of input elements 502J, which may pass user information (e.g., user personal identifier) to mobile device 502. In some cases, one or more of input elements 502J may be utilized to navigate through various screens of mobile application 502B.

In some embodiments, where mobile device 502 is a phone or other similar computing device, mobile device 502 may include a browser stored in the memory element 502C and may be configured to retrieve, present, and send data across a communications network (e.g., the Internet). In such embodiments, mobile device 502 may be configured to send data as part of a transaction. In some embodiments, mobile device 502 may provide the data upon request from another entity, such as an access device.

Figure 6:
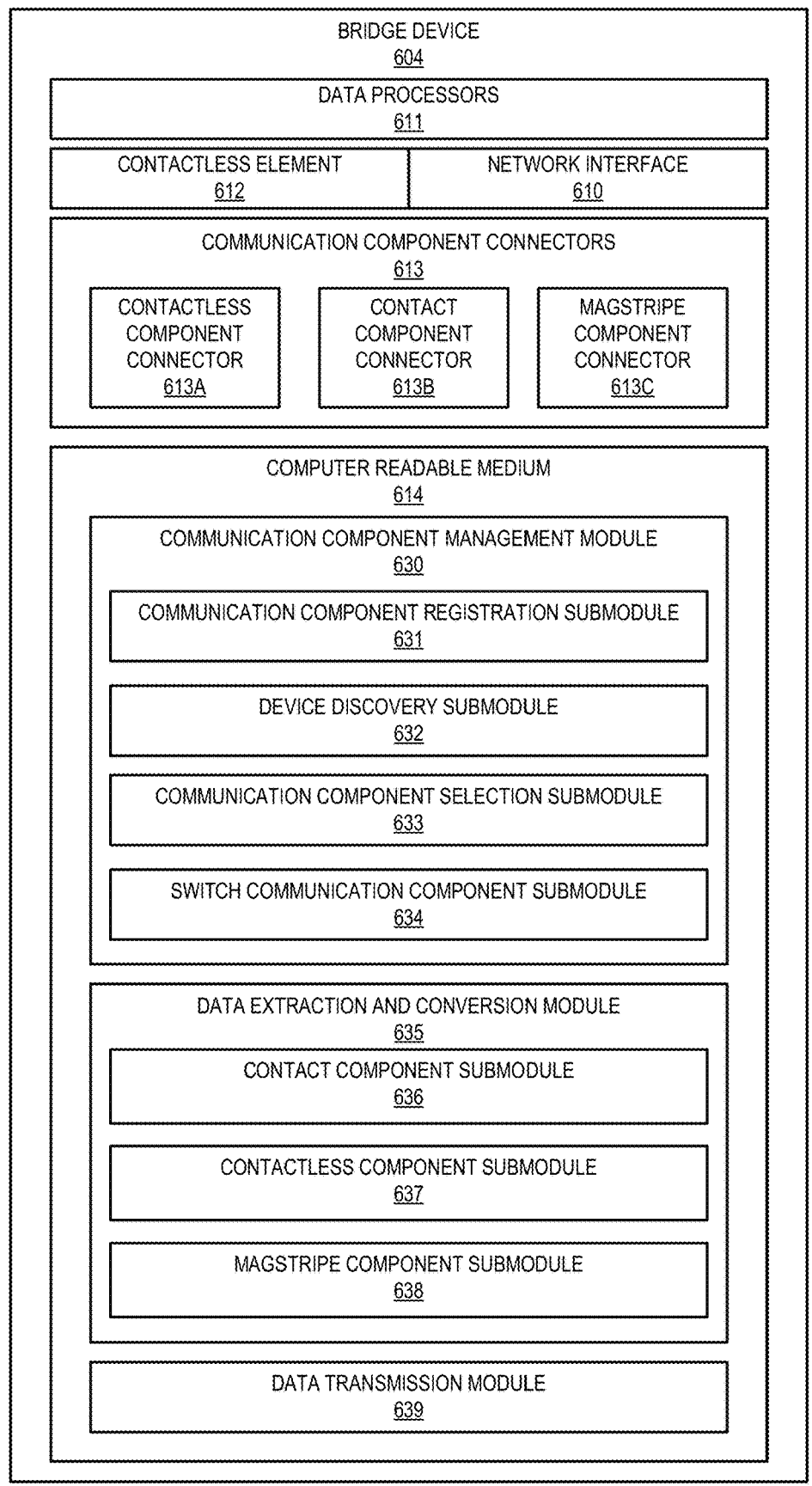
FIG. 6 shows a block diagram of a bridge device according to embodiments of the invention.

FIG. 6 shows an exemplary bridge device 604 according to embodiments of the invention. Bridge device 604 comprises a combination of hardware and software components. The hardware components may include at least data processors 611, a contactless element 612, a network interface 610, a computer readable medium 614, and communication component connectors 613 including a contactless component connector 613A, a contact component connector 613B, and a magnetic stripe component connector 613C.

Data processors 611 may include one or more of any suitable types of processors. An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device. Data processors 611 may include any hardware within bridge device 604 that can carry out instructions embodied as code in computer readable medium 614.

Contactless element 612 may typically be implemented in the form of a semiconductor chip (or other data storage element) with an associated wireless transfer (e.g., data transmission) element, such as an antenna. Contactless element 612 may be associated with (e.g., embedded within) bridge device 602. Data or control instructions transmitted via a cellular network may be applied to contactless element 612 by means of a contactless element interface (not shown). In some cases, the contactless element interface may function to permit the exchange of data and/or control instructions between the circuitry of bridge device 602 and contactless element 612.

Contactless element 612 may enable support of any suitable wireless protocols that can be utilized to communicate with a mobile device. Contactless element 612 may enable Bluetooth® (e.g., Bluetooth® Version 4.0 with "Bluetooth® Smart" or "Bluetooth® Low Energy"). In some embodiments, there may also be support for NFC peer-to-peer communication. Although an access device may already include an EMV contactless interface, the working distance is typically ensured up to two centimeters or four centimeters. However, NFC peer-to-peer technology enabled on bridge device 604 can ensure more remote peer to peer communication for longer ranges, which can be convenient for payment purposes.

Network interface 610 may be any suitable combination of hardware and software that enables data to be transferred to and from bridge device 604. Network interface 610 may enable bridge device 604 to communicate data to and from a mobile device of a user for a transaction. Some examples of network interface 610 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by network interface 610 may include Wi-Fi™ (e.g., adhering preferably to at least IEEE 802.11 ac and IEEE 802.11g standards).

Data transferred via network interface 610 may be in the form of signals which may be electrical, electromagnetic, optical, or any other signal capable of being received by the external communications interface (collectively referred to as "electronic signals" or "electronic messages"). These electronic messages that may comprise data or instructions may be provided between network interface 610 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Communication component connectors 613 may be any suitable devices that enable bridge device 604 to connect to communication components of an access device. For example, communication component connectors 613 may enable bridge 604 to plug into a port or interface of the access device. In some embodiments, communication component connectors 613 may be located on or embedded in the housing of bridge device 604 or may be part of a cable that extends from the housing of bridge device 604 and connects to the access device. In some cases, all or some of the connectors included in communication component connectors 613 may be combined into a single device (e.g., one cable with multiple connectors) that can be connected to the access device. In other cases, one or more connectors of the communication component connectors 613 may be separate devices (e.g., multiple cables with single or multiple connectors) that can be connected to the access device. Communication component connectors 613 may be designed to adhere to known payment standards and configurations of the access device.

Communication component connectors 613 may comprise one or more connectors including contactless component connector 613A, contact component connector 613B, or magnetic stripe component connector 613C. When connected to the access device, contactless component connector 613A may enable communication from a payment device via bridge device 604 to the contactless component of the access device. When connected to the access device, contact component connector 613B may enable communication from a payment device via bridge device 604 to the contact component of the access device. When connected to the access device, magnetic stripe component connector 613C may enable communication from a payment device via bridge device 604 to the magnetic stripe component of the access device. Each connector of bridge device 404 attached to a communication component of access device 405 may have minimal to no interference from bridge device 404 on the communication.

Computer readable medium 614 may comprise a number of software modules including a communication component management module 630, data extraction and conversion module 635, and a data transmission module 639. Communication component management module 630 may include a communication component registration submodule 631, a device discovery submodule 632, a communication component selection submodule 633, and a switch communication component submodule 634. Data extraction and conversion module 635 may include a contact component submodule 636, a contactless component submodule 637, and a magnetic stripe component submodule 638.

Each module may comprise one or more functions implemented by code, executable by data processors 611. Any of the modules may comprise one or more submodules, where each submodule may comprise one or more functions implemented by code, executable by data processors 611. While certain exemplary modules and submodules are shown in FIG. 6, other modules and submodules may also reside on the computer readable medium 614. Further, the modules and submodules may be combined or split into one or more modules or submodules in any suitable manner. Examples of additional modules may include various data transmission modules for packaging data or processing and routing messages and message modification modules.

Communication component management module 630 may enable, with the data processors 611, any processing related to conducting a transaction by the mobile device of a user with a communication component of the access device. Communication component management module 630 may include communication component registration submodule 631, device discovery submodule 632, communication component selection submodule 633, and switch communication component submodule 634.

Communication component registration submodule 631, in conjunction with data processors 611, may enable bridge device 604 to register available communication components of the access device. In some embodiments, communication component registration submodule 631 may enable, in conjunction with data processors 611, a registration process that may be conducted prior to a transaction. This may allow bridge device 604 to know which communication components the access device has available and communicate the known information to the mobile device of the user. There are various ways in which the registration process can be conducted. Communication component registration submodule 631 may communicate, in conjunction with data processors 611, any of the registered information to other submodules, such as device discovery submodule 632, communication component selection submodule 633, and switch communication component submodule 634, as appropriate.

In one case, the registration process may comprise bridge device 604 being scanned for available interfaces. For example, bridge device 604 may be connected to the access device for the first time and a host of the access device (e.g., merchant) may be informed to enable the communication components one at a time. The contactless component of the access device may be enabled by a contactless payment device (e.g., hovering the contactless payment device over the access device). The contactless polling by the access device for communicating with the contactless payment device may be detected by bridge device 604, which can then register the contactless component of the access device as available. Additionally, the contact component of the access device may be enabled by a contact payment device (e.g., inserting contact payment device into the access device). The contact power up of the access device may be detected by bridge device 604, which can then register the contact component of the access device as an available communication component. For the magnetic stripe component of the access device, the magnetic stripe component may be registered manually or may be enabled as a default setting by the manufacturer of bridge device 604.

In another case, the registration process may be conducted manually. For example, the registration process may comprise activating buttons on bridge device 604 (e.g., software or hardware) that correspond to communication components. Activation of these buttons can trigger bridge device 604 to register the corresponding communication components as available communication components. This registration process may be repeated at any time and thus registered communication components may be changed when desired.

In another case, the registration process may be integrated into the manufacturing process of bridge device 604. For example, bridge device 604 may be built including compatibility with certain communication components set before shipment that cannot be changed at a later time. Bridge device 604 may recognize these communication components to be the available communication components.

In some embodiments, communication component registration submodule 631 may enable, in conjunction with data processors 611, registration of a priority order of available communication components. The priority order may be manually input into bridge device 604 or may be integrated into the manufacturing process of bridge device 604. In some cases, the order of activation of communication components during the registration process may correspond to the priority order.

For example, bridge device 604 may be registered to prioritize selecting the contactless component when contactless, contact, and magnetic stripe components are available for the access device. In other cases, if only contact and magnetic stripe components are available, bridge device 604 may be registered to select the contact component. Any possible priority order for the available communication components may be registered. Some exemplary priority orders are shown in the table below.

| Available communication components vs Priority (1 highest) | Mag-stripe only | Contact Mag-stripe | Contactless Contact Mag-stripe | Contactless Mag-stripe |
|---|---|---|---|---|
| Contactless | — | — | 1 | 1 |
| Contact | — | 1 | 2 | — |
| Magstripe | 1 | 2 | 3 | 2 |

In some embodiments, utilization of a contact component or contactless component may be preferred over a magnetic stripe component. This may be because the contact technologies and contactless technologies may provide better security for a transaction. For example, contact technologies may utilize dynamic data for transactions (e.g., typically generated by a card chip). The use of the dynamic data can ensure that transactions are more secure.

Device discovery submodule 632 may enable, with the data processors 611, any processing related to establishing a wireless connection with the mobile device of the user. For example, device discovery submodule 632 may enable, in conjunction with the data processors 611 and contactless element 612, continuous polling for mobile devices using a wireless protocol (e.g., Bluetooth®, Wi-Fi™, etc.) and upon discovery of a mobile device, establishing of a wireless connection with the mobile device using the wireless protocol. In response to establishing the wireless connection, device discovery submodule 632 may also determine, in conjunction with the data processors 611, whether the mobile device is capable of conducting a transaction involving bridge device 604.

Accordingly, the mobile device may send an acknowledgement to bridge device 604, which device discovery submodule 632 may process, in conjunction with the data processors 611. If the acknowledgement includes an indication that the mobile device is running a bridge device mobile application that enables transactions to be conducted with bridge devices, such as bridge device 604, then a transaction between bridge device 604 and the mobile device may be initiated. In some embodiments, the indication may include an application identifier (AID). If the acknowledgement from the mobile device is not received or an indication that the bridge device mobile application is not available is received, device discovery submodule 632 may, in conjunction with the data processors 611, may terminate the connection between bridge device 604 and the mobile device.

Communication component selection submodule 633 may enable, with the data processors 611, selection of a communication component to utilize for the transaction conducted between the mobile device of the user and the access device. Communication component selection submodule 633 may generate, in conjunction with data processors 611, a proprietary message (e.g., command) and send it to the mobile device informing the available communication components of the access device. The available communication components may be communicated from communication component registration submodule 631. Subsequently, communication component selection submodule 633 may analyze, in conjunction with data processors 611, a response from the mobile device indicating a selection from the sent available communication components to determine the communication component to utilize for the transaction. Accordingly, communication component selection submodule 633 may notify the access device to activate the selected communication component.

While the selection of the communication component by the mobile device is described above, embodiments are not so limited. In some cases, the selection of the communication component may be made by bridge device 604 instead of the mobile device. In some embodiments, bridge device 604 may have registered an order of priority of available communication components, as described with respect to communication component registration submodule 631. Hence, communication component selection submodule 633 may select, in conjunction with data processors 611, the communication component for the transaction based off of the predetermined registered priority order and notify the mobile device of the selection. The selected communication component may be utilized for the transaction, unless the mobile application of the mobile device requests otherwise.

Switch communication component submodule 634 may enable, with data processors 611, switching the communication component to be utilized for the transaction. In some embodiments, this may be triggered by an error that occurs in the communication component during the transaction or receiving a request from the mobile device to switch the communication component. Switch communication component submodule 634 may, in conjunction with data processors 611, analyze a proprietary request command received from the mobile device demanding to switch the communication component any time during the transaction and then send a response acknowledging receipt of the command back to the mobile device. An exemplary command is described with respect to FIG. 8. Switch communication component submodule 634 may then, in conjunction with data processors 611, notify the access device to switch the communication component, which may cause the access device to deactivate the currently selected communication component and instead activate the communication component for which the mobile device requested the transaction be conducted with instead.

Data extraction and conversion module 635 may enable, with data processors 611, processing of data sent between the mobile device and the access device for the transaction. Since the mobile device may communicate data using a wireless protocol (e.g., Wi-Fi™, Bluetooth®) and the access device may communicate data utilizing other different protocols for each communication component, data extraction and conversion module 635 can ensure appropriate data conversion so that each entity can properly process information for the transaction. Data extraction and conversion module 635 may include contact component submodule 636, contactless component submodule 637, and magnetic stripe component submodule 638.

Contact component submodule 636 may enable, with data processors 611, processing related to a transaction utilizing the contact component of the access device. Contact component submodule 636 may enable, in conjunction with data processors 611 and contact component connector 613B, detection of whether the contact component of the access device is activated or deactivated, as well as resets. Contact component submodule 636 may also enable, in conjunction with data processors 611, processing of data between the mobile device and the access device during the transaction. In some embodiments, in response to detecting that the contact component is activated, contact component submodule 636 may send, in conjunction with data processors 611, a default command (e.g., ATR) to the access device in order to initiate the transaction utilizing the contact component.

Subsequently, the mobile device and the access device may send one or more messages back and forth to complete the transaction. Contact component submodule 636 may receive, in conjunction with data processors 611, commands from the contact component of the access device (e.g., from T=1 or T=0 adhering to ISO/IEC 7816 protocol) and then extract data from the commands. Contact component submodule 636 may then convert, in conjunction with data processors 611, the received commands by inserting the extracted data into a payload of a message sent by the wireless protocol supported by the mobile device (e.g., Bluetooth® payload). Contact component submodule 636 may also receive, in conjunction with data processors 611, requests or responses from the mobile device using the wireless protocol and then extract data from the payload (e.g., Bluetooth® payload). Contact component submodule 636 may then convert, in conjunction with data processors 611, the received requests or responses by inserting the extracted data into messages that are relayed to the contact component of the access device (e.g., by T=1 or T=0 adhering to ISO/IEC 7816 protocol). In this way, bridge device 604 may enable simulation of a contact transaction.

Contactless component submodule 637 may enable, with data processors 611, processing related to a transaction utilizing the contactless component of the access device. Contactless component submodule 637 may enable, in conjunction with data processors 611 and contactless component connector 613A, detection of whether the contactless component of the access device is powered up and polling for device discovery, as well as resets. Contactless component submodule 637 may enable, in conjunction with data processors 611, processing of data between the mobile device and the access device during the transaction and may simulate a Type A or Type B contactless card transaction, adhering to ISO/IEC 14443 protocols.

Subsequently, the mobile device and the access device may send one or more messages back and forth to complete the transaction. Contactless component submodule 637 may receive, in conjunction with data processors 611, commands from the contactless component of the access device (e.g., from Type A or Type B adhering to ISO/IEC 14443 protocol) and then extract data from the commands. Contactless component submodule 637 may then convert, in conjunction with data processors 611, the received commands by inserting the extracted data into a payload of a message sent using the wireless protocol supported by the mobile device (e.g., Bluetooth® payload). Contactless component submodule 637 may also receive, in conjunction with data processors 611, requests or responses from the mobile device using the wireless protocol and then extract data from the payload (e.g., Bluetooth® payload). Contactless component submodule 637 may then convert, in conjunction with data processors 611, the received requests or responses by inserting the extracted data into messages that are relayed to the contactless component of the access device (e.g., by Type A or Type B adhering to ISO/IEC 14443 protocol). In this way, bridge device 604 may enable simulation of a contactless transaction.

Magnetic stripe component submodule 638 may enable, with data processors 611, processing related to a transaction utilizing the magnetic stripe component of the access device. Magnetic stripe component submodule 638 may receive, in conjunction with data processors 611, data from the mobile device in a payload using the wireless protocol supported by the mobile device (e.g., Bluetooth® payload). The data may include Track 1 and Track 2 data utilized for a typical magnetic stripe card swipe transaction. For example, this data may include a PAN, the cardholder's name, an expiration date, a service code, a country code, and other discretionary data. Contactless component submodule 637 may then extract, in conjunction with data processors 611, the relevant Track 1 and Track 2 data, convert the data to a format adhering to ISO/IEC 7811 standards, and transmit the converted data to the magnetic stripe component (e.g., magnetic stripe reader head) of the access device. In this way, bridge device 604 may enable simulation of a magnetic stripe transaction.

Data transmission module 639 may enable, with data processors 611, handling of any sending of data between the mobile device and the access device. For example, data transmission module 639 may, in conjunction with data processors 611, route messages to their appropriate destinations (e.g., mobile application of the mobile device, communication components of the access device). In some embodiments, data transmission module 639 may manage, in conjunction with data processors 611, timing of message transmissions. For example, if there is a delay on a response from the mobile application of the mobile device, data transmission module 639 may be capable of issuing, in conjunction with data processors 611, wait time requests for the communication component of the access device that is being utilized for the transaction. The wait time requests may be any suitable requests that adhere to the specifications of the communication component.

Use of a bridge device, such as bridge device 604, offers several advantages. For example, the bridge device may be utilized with any existing terminal, mobile wallet (e.g., issuer wallet, device wallet etc.), and any mobile device having wireless communication capabilities. In contrast, alternative systems and methods (e.g., certain digital wallet services, host card emulation (HCE), beacons, etc.) that enable transactions between mobile devices and access devices may not be able to support use of all communication components (e.g., magnetic stripe component, contact component, contactless component) of existing access devices. In addition, in alternative systems and methods, a specific communication component or customized software at the access device, a mobile device running a particular operating system with specific hardware capabilities (e.g., NFC), and a specific mobile wallet may need to be available to be able to conduct a transaction. Thus, the bridge device provides more flexibility since it enables users to easily conduct transactions with existing access devices by simply installing bridge device mobile applications on their mobile devices. This reduces fragmented user experience and instead creates a unified user mobile experience (e.g., "swipe," "insert," and "tap").

Additionally, while the bridge device increases the options of usable communication components between mobile devices and access device, the use of the bridge device may still protect security measures. While alternative systems and methods may provide security by only hardware or only software mechanisms, the bridge device can employ advanced security architecture leveraging both hardware and software. For example, access to the bridge device may be protected since access is limited to mobile devices with a bridge device mobile application. Additionally, the connection to bridge device may utilize security measures of the wireless protocol.

Figure 7:
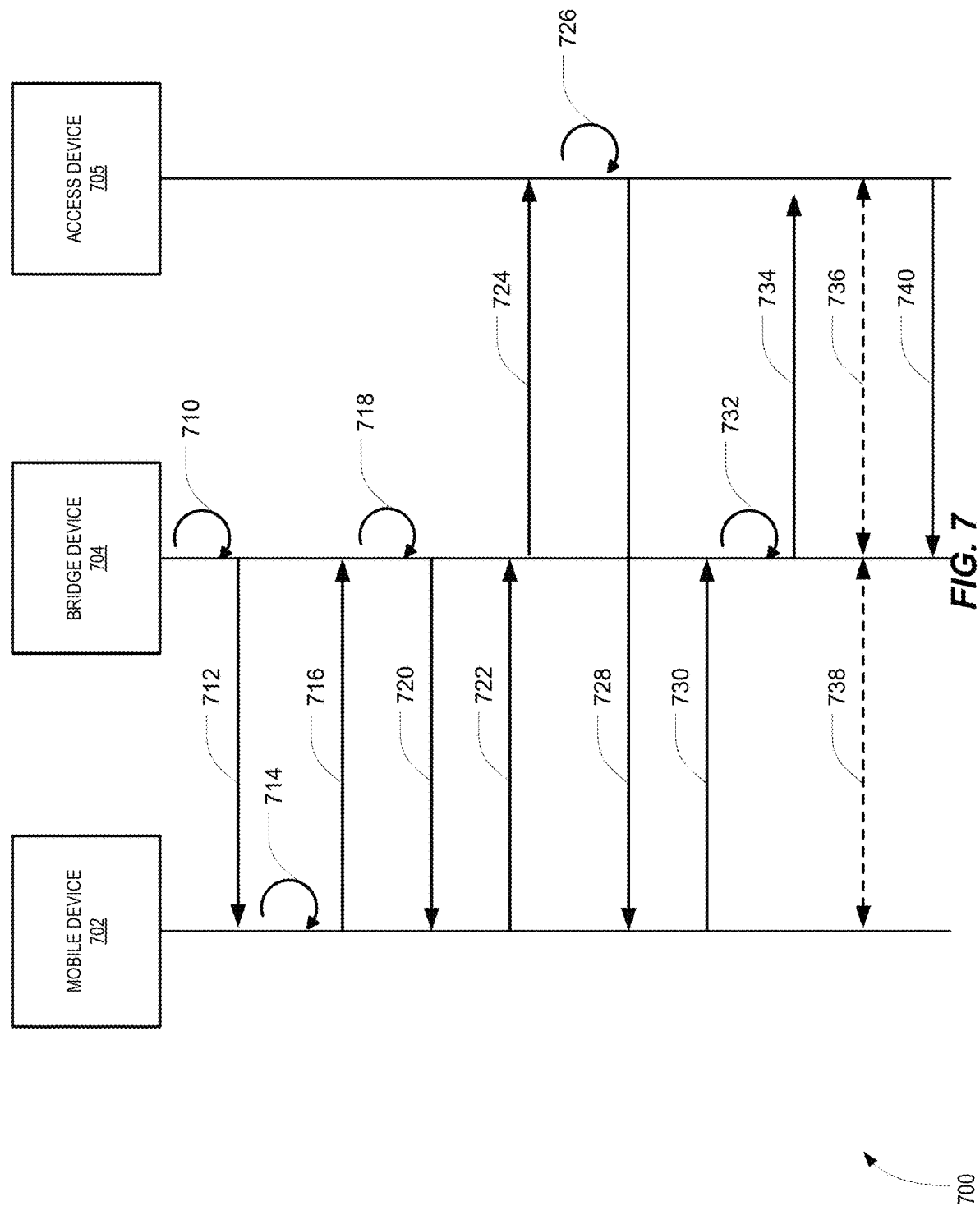
FIG. 7 shows an exemplary flow diagram for a mobile device, a bridge device, and an access device according to embodiments of the invention.

FIG. 7 shows an exemplary flow diagram 700 for a mobile device, a bridge device, and an access device according to embodiments of the invention. FIG. 7 includes mobile device 702, bridge device 704, and access device 705. A user may conduct the transaction using mobile device 702, which may communicate with bridge device 704, which is in communication with access device 705. Access device 705 may comprise communication components, which may include a contactless component, a contact component, and a magnetic stripe component. Mobile device 702 may run a mobile application that is bridge device for transactions involving a bridge device, such as bridge device 704. Certain steps included in FIG. 7 are described with respect to flowchart 800 of FIG. 8 (indicated by steps S801, S802, etc.), which shows an exemplary transaction in which a bridge device is in communication with an access device that has an available contactless component and magnetic stripe component.

At step 710, bridge device 704 may search for mobile devices (e.g., by a "discovery" process). Bridge device 704 may continuously poll for surrounding mobile devices using a wireless protocol (e.g., Bluetooth®, Wi-Fi™, etc.) (S801). As long as no mobile devices can be detected, bridge device

804 may continue to search for mobile devices (S802). Bridge device 704 may be able to detect if mobile device 702 enters into a field within vicinity accessible by the wireless network connection enabled by the wireless protocol. For example, mobile device 702 may be a Bluetooth® enabled device and bridge device 704 may connect to mobile device 702 by a Bluetooth® connection.

Accordingly, bridge device 704 can detect mobile devices that are not necessarily right next to a POS terminal, but located at any suitable distance (e.g., in a line formed by the terminal, elsewhere in a merchant store, etc.) in which the wireless connection can be established. This is advantageous because communication between bridge device 704 and mobile device 702 may be established before it is time for the user to pay at the terminal. Additionally, bridge device 704 may detect more than one mobile device at a time. These features can make transactions more efficient.

At step 712, if mobile device 702 is detected by bridge device 704, bridge device 704 and mobile device 702 may establish a wireless connection (S803). As described above, the wireless connection may be enabled by any suitable wireless networking technology that allows bridge device 704 to detect when mobile device 702 is in range. Further, the wireless connection may enable any suitable information to be communicated between bridge device 704 and mobile device 702. For example, bridge device 704 and mobile device 702 may establish a Bluetooth® connection.

At step 714, upon detecting a wireless connection with bridge device 704, mobile device 702 may launch the mobile application for conducting a transaction involving bridge device 704. The mobile application may be a bridge device mobile application that can handle processing of data sent to from a bridge device, such as bridge device 704. In some cases, the mobile application may be issued by an issuer.

At step 716, upon launching, the mobile application may discover bridge device 704. The mobile application may recognize that mobile device 702 and bridge device 704 have established a wireless connection. Subsequently, the mobile application may notify bridge device 704 that mobile device 702 is capable of conducting a transaction with bridge device 704 by confirming the existence of the bridge device mobile application on mobile device 702 (e.g., by sending one or more of an application identifier (AID), wallet identifier associated with the mobile application, application configuration options associated with the AID, etc.). In some embodiments, this acknowledgement sent to bridge device 704 may be initiated by the user interacting with an interface of the mobile application. For example, the mobile application may display a message to the mobile application that bridge device 704 has been discovered and further prompt the user for approval to continue the transaction with bridge device 704. The user may confirm or decline by any suitable interactions with the mobile application interface (e.g., activating a button, inputting a voice command, etc.). If the user declines, the connection between mobile device 702 and bridge device 704 may be terminated. If the user approves, the transaction may continue as described in step 718.

While an exemplary case in which mobile device 702 automatically launches the mobile application is described above, in some cases, the user may actively launch the mobile application on mobile device 702 for use in the transaction. Upon launching, if the mobile application discovers bridge device 704, the mobile application may send an acknowledgement to bridge device 704, as described above. The acknowledgement may indicate that mobile device 702 includes the bridge device mobile application and is capable of conducting a transaction involving bridge device 704. Subsequently, the transaction may continue as described in step 718.

At step 718, upon receiving, from mobile device 702, the indication that a transaction can be conducted with bridge device 704, bridge device 704 may determine available communication components of access device 705. These may be determined based off of communication components that are registered with bridge device 704 as available communication components. In some embodiments, the available communication components may be registered to bridge device 704 prior to the transaction, such as during installation of bridge device 704. This registration process, which can be conducted by a host (e.g., resource providing entity) of bridge device 704 and access device 705, may be conducted in various ways and is described in further detail with respect to FIG. 6.

At step 720, bridge device 704 may notify mobile device 702 of the determined available communication components of access device 705 (S804). The determined available communication components may be indicated in any suitable message. For example, bridge device 704 may send mobile device 702 an available interface (AI) command over the established Bluetooth® connection. In some embodiments, the AI command may be the first command sent from bridge device 704 to mobile device 702 once communication on wireless protocol is established.

In an exemplary case, bridge device 704 may determine that access device 705 has available a contact component and a magnetic stripe component. This may be indicated in the AI command. In some implementations, the AI command may be two bytes, wherein the second byte may hold information regarding available communication components for the transaction in designated bits (see example of second byte in table below). For example, bit 2 may correspond to whether the contact component is available, bit 3 may correspond to whether the contactless component is available, and bit 4 may correspond to whether the magnetic stripe component is available.

| Bit 8 | Bit 7 | Bit 6 | Bit 5 | Bit 4 | Bit 3 | Bit 2 | Bit 1 |
|---|---|---|---|---|---|---|---|
| 0 (RFU) | 0 (RFU) | 0 (RFU) | 0 (RFU) | 1 (magstripe component available) | 1 (contactless component available) | 1 (contact component available) | 0 |

Accordingly, in the exemplary case in which only contact and magnetic stripe components are available, the second byte may indicate a hexadecimal value of "OA," indicating the presence of bit 2 and bit 4. An exemplary AI command may then have a hexadecimal value of "78 OA," wherein the "0" values may represent reserved for future use (RFU) values that can be ignored by the recipient. However, any suitable bit configurations may be utilized in the command as appropriate to indicate the available communication components.

Upon receiving the notification of available communication components from bridge device 704, the mobile application on mobile device 702 may make a selection of a communication component from the available communication components. The selected communication component may be utilized for the transaction.

At step 722, mobile device 702 may send a request to conduct the transaction including the selection of the communication component to bridge device 704 (S805). The communication of the selection from mobile device 702 may indicate to bridge device 704 that mobile device 702 is ready to receive commands from access device 705. The selection of the communication component may be indicated in any suitable message. In one example, mobile device 702 may send bridge device 704 an available interface (AI) response over the established Bluetooth® connection.

In some embodiments, the request may also ask access device 705 for certain transaction data to utilized for the transaction, such as an entity identifier, a merchant identifier (MID), terminal processing options (TPO), authorized amount, other amount, terminal country code, terminal verification results, transaction currency code, transaction data, and transaction type. In other embodiments, this request for information may be provided as part of the messages sent from mobile device 702 for selecting a communication component, notifying that mobile device 702 has the bridge device mobile application, or other purpose.

Figure 8:
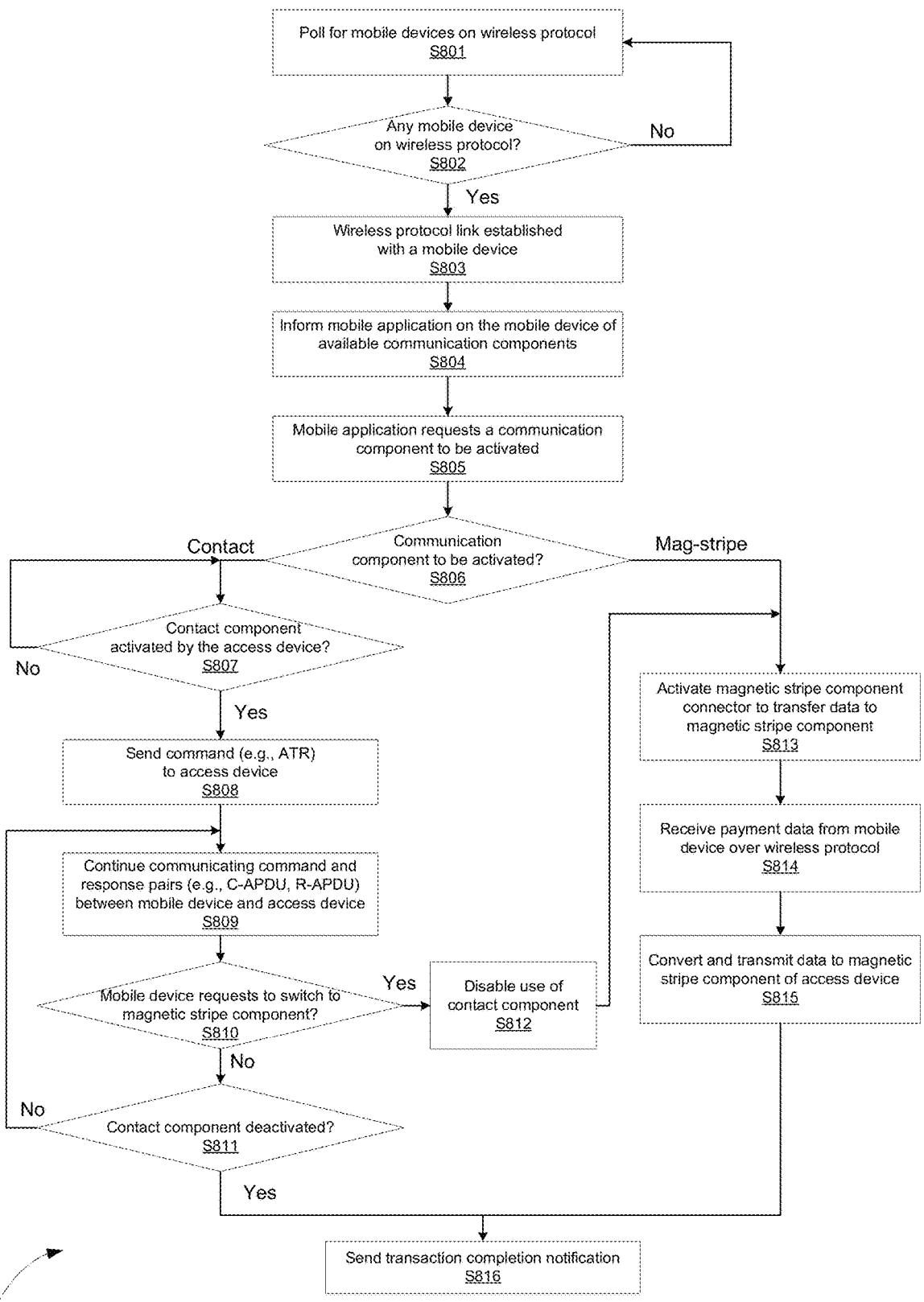
FIG. 8 shows an exemplary flow diagram for a bridge device conducting a transaction according to embodiments of the invention.

In an exemplary case, such as in FIG. 8, mobile device 702 may select the contact component from the available communication components for use in the transaction and send the selection to bridge device 704 (S806). This may be indicated in the AI response. In some implementations, the AI response may be five bytes, wherein the second byte may hold information regarding the selected communication component for the transaction in designated bits (see examples of second byte in table below). For example, bit 2 may correspond to whether the contact component is selected, bit 3 may correspond to whether the contactless component is selected, and bit 4 may correspond to whether the magnetic stripe component is selected.

| Bit 8 | Bit 7 | Bit 6 | Bit 5 | Bit 4 | Bit 3 | Bit 2 | Bit 1 |
|-------|-------|-------|-------|-------|-------|-------|-------|
| 0 (RFU) | 0 (RFU) | 0 (RFU) | 0 (RFU) | 1 (magstripe component is selected) | 0 | 0 | 0 |
| 0 (RFU) | 0 (RFU) | 0 (RFU) | 0 (RFU) | 0 | 1 (contactless component is selected) | 0 | 0 |
| 0 (RFU) | 0 (RFU) | 0 (RFU) | 0 (RFU) | 0 | 0 | 1 (contact component is selected) | 0 |

Accordingly, in the exemplary case in which the contact component is selected, the second byte may indicate a hexadecimal value of "02," indicating the presence of bit 2. An exemplary AI response may then have a hexadecimal value of "C3 02 00 00 00" in this case, wherein the "0" values may represent reserved for future use (RFU) values that can be ignored by the recipient. However, any suitable bit configurations may be utilized in the response as appropriate to indicate the selected communication component.

At step 724, bridge device 704 may communicate the selected communication component to access device 705. This may notify access device 705 as to which communication component to activate for the transaction.

At step 726, access device 705 may activate the selected communication component. In some cases, bridge device 704 may check whether the selected communication component has been activated by access device 705 and continue to do so until bridge device 704 is able to detect that the selected communication component has been activated. For example, such as in FIG. 8, if the selected communication component is the contact component, bridge device 704 may check whether the contact component of access device 705 is activated (S807). Depending on the communication component that is activated, bridge device 704 may process different data for the transaction.

For example, such as in FIG. 8, in the case of utilizing the contact component for the transaction, bridge device 704 may initially send a default command to access device 705 (S808). This command may be an Answer To Reset (ATR) message output that is typically sent by a contact device (e.g., contact smart card) to access device 705. Bridge device 704 may instead generate and send this ATR message to simulate a contact transaction.

At step 728, access device 705 may initiate the transaction by sending application commands, which bridge device 704 may communicate to mobile device 702. For example, access device 705 may send a transaction request message requesting transaction data from the mobile application of mobile device 702. In some embodiments, access device 705 may send the transaction request message using a specific communication protocol corresponding to the selected communication component (e.g., Type A or B for contactless adhering to ISO/IEC 14443 protocol, T=1 or T=0 for contact adhering to ISO/IEC 7816 protocol) to bridge device 704. Bridge device 704 may then extract information from the received transaction request message, convert the information into a payload that can be sent by the wireless protocol (e.g., Wi-Fi™, Bluetooth®) supported by mobile device 702, and send the converted payload to mobile device 702.

In an exemplary case, such as in FIG. 8, using the contact component of access device 705 for the transaction, access device 705 may send a Select Payment System Environment (PSE) command by the T=1 communication protocol. In some embodiments, the command may include a payment environment identifier to identify the contact component. Bridge device 704 may extract the command from the T=1 communication protocol of access device 705, convert it to a Bluetooth® payload that can be accepted by mobile device 702, and send the Bluetooth® payload to mobile device 702.

At step 730, mobile device 702 may send a response to bridge device 704. In some embodiments, the user may provide transaction data (e.g., file control information (FCI)) to mobile device 702 in response to the transaction request from access device 705. For example, the user may enter transaction data (e.g., as part of a payment request or payment order) into the interface of the mobile application of mobile device 702. The mobile application may then generate a transaction response message with a payload including information from the entered payment order and other account information (e.g., account identifier, token, or other account parameters) that may be utilized by the selected communication component of access device 705. The transaction response message may be sent using the wireless protocol supported by mobile device 702 (e.g., Bluetooth®).

At step 732, bridge device 704 may generate a transaction message that can be accepted by the selected communication component of access device 705. Upon receiving the transaction response message from mobile device 702, bridge device 704 may extract the transaction data from its payload and convert the extracted data such that it may be sent using a communication protocol supported by the selected communication component of access device 705.

In an exemplary case, such as in FIG. 8, when using the contact component of access device 705 for the transaction, bridge device 704 may extract the payload from the response to the Select PSE command and insert it into a message that can be accepted by the T=1 communication protocol.

Typically, during use of the T=1 communication protocol for transactions conducted with the communication component, there may be a certain time limit in which a response from bridge device 704 is expected from access device 705. If a response is not received within the certain time limit, this may cause a timeout and termination of the transaction. To accommodate, if the response from the mobile application of mobile device 702 received over the wireless protocol (e.g., Bluetooth®) is delayed for any reason, bridge device 704 may issue a wait time request (e.g., S block type Wait Time Extension (WTX) request in the protocol control byte (PCB) of the block frame), according to the T=1 communication protocol. Upon receiving the wait time request, access device 705 may send a wait time response (e.g., WTX response) that acknowledges receipt of the wait time request and indicates that the transaction is not terminated. Bridge device 704 may send as many wait time requests as needed until the response from the mobile application of mobile device 702 is ready to be sent to access device 705.

At step 734, bridge device 704 may send the converted data to access device 705. The selected communication component of access device 705 may receive and process the received data and determine whether further messages should be sent to complete the transaction. If access device 705 determines that further messages are to be sent to mobile device 702, bridge device 704 may communicate one or more transaction messages between mobile device 702 and access device 705, as described in step 736 and 738.

At steps 736 and 738, bridge device 704 may continue to communicate transaction messages between access device 705 and mobile device 702 during the rest of the transaction. The number of messages relayed between mobile device 702 and access device 705 may vary based on various factors, such as the selected communication component and data entered by the user into mobile device 702. Thus, steps 736 and 738 may represent communication of multiple message pairs sent between mobile device 702 and access device 705 via bridge device 704.

In some cases, as shown in FIG. 8, the messages may be command requests and responses that include any suitable information utilized to complete the transaction (S809). For example, the command requests may be command application protocol data units (C-APDU) typically sent by access device 705 to a card and the command responses may be response application protocol data units (R-APDU) typically sent by the card to access device 705. Each message sent between bridge device 704 to mobile device 702 may be sent using the wireless protocol supported by mobile device 702, such as Bluetooth®. Accordingly, bridge device 704 may extract data from C-APDUs and insert the data into Bluetooth® payloads to send to mobile device 702, as well as extract data from Bluetooth® payloads received from mobile device 702 and insert the data into R-APDUs to send to access device 705.

In some embodiments, the selected communication component may be switched during the transaction. For example, a request to switch the communication component may arise due to an error caused by the selected communication component or other suitable reason that prevents the transaction from successfully completing. The user of mobile device 702 may be informed, by the host of bridge device 704 (e.g., resource providing entity) or a message displayed on access device 705, that the transaction is to be conducted using another communication component that is available to access device 705. The user may request through the mobile application of mobile device 702 to conduct another transaction using an alternative communication component. If no request to switch the communication component is received (S810), the transaction may be processed utilizing the originally selected communication component. Bridge device 704 may continue communicating messages between mobile device 702 and access device 705 as appropriate until bridge device 704 detects that the selected communication component is deactivated and has completed transmissions for the transaction (S811).

In some embodiments, the request to switch the selected communication component may be sent using a Switch Interface (SI) request. The SI request may be sent from mobile device 702 to bridge device 704 at any time during the transaction and may include information indicating a switch to a communication component. In some implementations, the SI request may be three bytes, wherein the third byte may hold information regarding the communication component that mobile device 702 is requesting to switch to in designated bits (see examples of third byte in table below). For example, bit 2 may correspond to whether the selected communication component is to be switched to the contact component, bit 3 may correspond to whether the selected communication component is to be switched to the contactless component, and bit 4 may correspond to whether selected communication component is to be switched to the magnetic stripe component.

| Bit 8 | Bit 7 | Bit 6 | Bit 5 | Bit 4 | Bit 3 | Bit 2 | Bit 1 |
|---|---|---|---|---|---|---|---|
| 0 (RFU) | 0 (RFU) | 0 (RFU) | 0 (RFU) | 1 (switch to magstripe component) | 0 | 0 | 0 |

-continued

| Bit 8 | Bit 7 | Bit 6 | Bit 5 | Bit 4 | Bit 3 | Bit 2 | Bit 1 |
|---|---|---|---|---|---|---|---|
| 0 (RFU) | 0 (RFU) | 0 (RFU) | 0 (RFU) | 0 | 1 (switch to contactless component) | 0 | 0 |
| 0 (RFU) | 0 (RFU) | 0 (RFU) | 0 (RFU) | 0 | 0 | 1 (switch to contact component) | 0 |

Upon receiving the SI request, bridge device 704 may send a Switch Interface (SI) response to mobile device 702 acknowledging the receipt of the SI request. In some implementations, the SI request may be one byte and may be a predetermined value indicating that the SI request was successfully received.

In an exemplary case, as shown in FIG. 8, mobile device 702 may request to switch the selected communication component for the transaction from the contact communication component to the magnetic stripe component (S810). This may be caused by an error in the contact component of access device 705, causing access device 705 to notify the user to switch the selected communication component to the magnetic stripe component. In some cases, this notification may be shown on the display of access device 705. The user of mobile device 702 may then request through the mobile application to conduct a second transaction by the magnetic component, which may cause bridge device 704 to disable use of the contact component of access device 705 (S812). In other cases, the request to switch the selected communication component may be initiated by the user due to user preference.

As described above, the request made be sent using a SI request. For example, mobile device 702 may send the SI request including a third byte of hexadecimal value "08," indicating the presence of bit 4 corresponding to a request to switch the selected communication component to the magnetic stripe component. An exemplary SI request may then have a hexadecimal value of "00 23 08" in this case, wherein the "0" values may represent reserved for future use (RFU) values that can be ignored by the recipient. However, any suitable bit configurations may be utilized in the request as appropriate to indicate the switch of the communication component. Upon receiving the SI request, bridge device 704 may send a SI response to mobile device 702 acknowledging the request to switch the selected communication component. In an exemplary case, the SI response may have a hexadecimal value of "39," which may be a predetermined value indicating the successful receipt of the SI request.

After the request to switch the selected communication component is acknowledged, bridge device 704 may activate the magnetic stripe component connector to transfer data to the magnetic stripe component of access device 705 (S813). Bridge device 704 may send a request for payment data from mobile device 702 using the Bluetooth® connection. Mobile device 702 may then send payment data, Track 1 and Track 2 data utilized with the magnetic stripe component, in a Bluetooth® payload, which may be received by bridge device 704 (S814). For example, this data may include a PAN, the cardholder's name, an expiration date, a service code, a country code, and other discretionary data. Bridge device 704 may then extract the Track 1 and Track 2 data from the payload of the Bluetooth® protocol frame and convert the data into an appropriate format (e.g., adhering to ISO/IEC 7811 standard) supported by the magnetic stripe component of access device 705. Bridge device 704 may then transmit the converted data to the magnetic stripe component (e.g., magnetic stripe reader head) of access device 705 (S815), which may receive and utilize the data to process the transaction.

At step 740, access device 705 may notify bridge device 704 that the transaction is completed. In some cases, bridge device 704 may forward the notification to the mobile application on mobile device 702, indicating to the user that the transaction has been successfully completed (S816).

Figure 9:
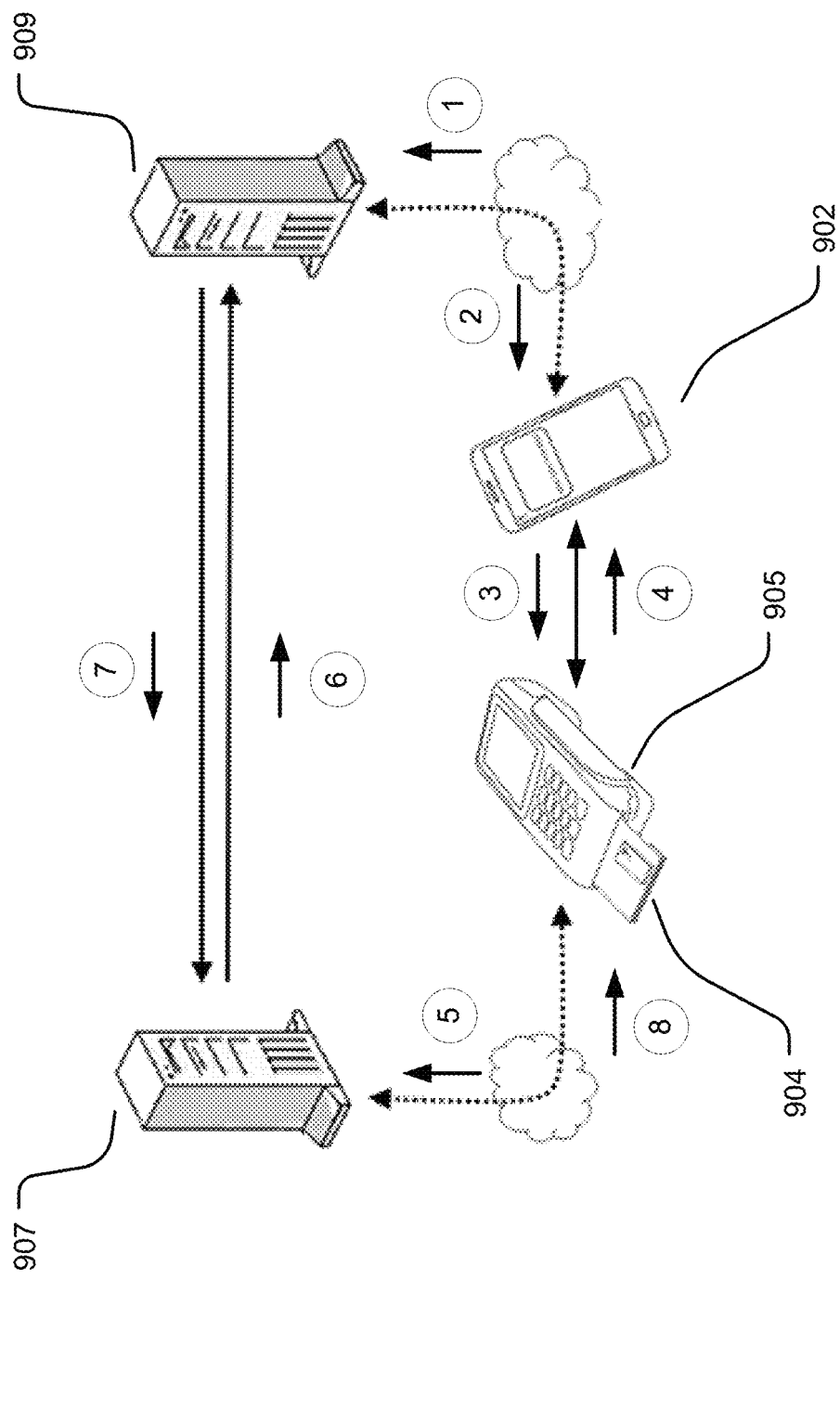
FIG. 9 shows an exemplary flow diagram of an overall structure of a transaction according to embodiments of the invention.

FIG. 9 shows an exemplary flow diagram 900 of an overall structure of a transaction according to embodiments of the invention. FIG. 9 includes mobile device 902, bridge device 904, access device 905, acquirer computer 907, and issuer computer 909. Other entities may be involved in the transaction, such as a payment processing network and merchant computer, such as shown in FIG. 1. A user, such as user 101 in FIG. 1, may operate mobile device 902 and conduct a transaction using bridge device 504 and access device 905. The user may be a cardholder conducting a transaction with a resource providing entity (e.g., merchant).

At step 1, the user may download a mobile application from a trusted application store on mobile device 902. The mobile application may be installed on mobile device 902. In some embodiments, the user may already have the mobile application installed on mobile device 902 and thus the downloading step may not be necessary. The mobile application may be a bridge device mobile application hosted by issuer computer 909 that enables mobile device 902 to conduct transactions with bridge device 504 and access device 905.

At step 2, issuer computer 909 may request the user to set up their payment account with the mobile application. The user may enter information including their card account information and send it to issuer computer 909 for verification. Issuer computer 909 may determine whether the user's entered information can be verified and if so, send credentials to the mobile application via the payment processing network. For example, issuer computer 909 may send an account identifier or token and additional information (e.g., a transaction cryptogram, account parameters, etc.) associated with the user's account that can be provisioned to the mobile application on mobile device 902. The token may be provided by a token service at the payment processing network.

At step 3 and step 4, multiple messages may be sent between mobile device 902 and bridge device 904 to conduct the transaction. While these messages are described at a high level with respect to FIG. 9, it is understood that steps described in FIG. 7 and FIG. 8 may be included or combined with at least steps 3 and 4 described in FIG. 9.

Initially, mobile device 902 may connect to bridge device 904 by a wireless connection, if mobile device 902 is in range with bridge device 904. The mobile application on mobile device 902 may send a notification to bridge device 904 that mobile device 902 is capable of conducting a transaction with bridge device 904. In some embodiments, the notification may include an application identifier (AID) of the mobile application, which can identify that the mobile application is a bridge device mobile application. Bridge device 904 may then respond with an acknowledgment of receipt of the notification to mobile device 902. The user may launch the mobile application and mobile device 902 before or after the wireless connection between mobile device 902 and bridge device 904 is established. Further, bridge device 904 may communicate available communication components (e.g., magnetic stripe component, contactless component, contact component) of access device 905 to mobile device 902, which may select a communication component to utilize for the transaction.

The mobile application may then send payment commands to bridge device 904 by the wireless connection. Payment commands received by bridge device 904 may be translated to be compatible with protocols supported by the selected communication component (e.g., T=1 or T=0 for contact adhering to ISO/IEC 7816 protocol, Type A or Type B for contactless adhering to ISO/IEC 14443 protocol) of access device 905. Additionally, bridge device 904 may translate commands sent by access device 905 to be compatible with a protocol supported by mobile device 902 (e.g., Bluetooth®, Wi-Fi™, etc.). Mobile device 902 may send the account identifier or token and additional information (e.g., a transaction cryptogram, account parameters, etc.) to bridge device 904 for the transaction.

At step 5, access device 905 may connect to acquirer computer 907 for authorization. For example, access device 905 may generate an authorization request message including the account identifier or token and additional information (e.g., a transaction cryptogram, account parameters, etc.) and forward the authorization request message to acquirer computer 907.

At step 6, acquirer computer 907 may send the authorization request message to issuer computer 909. In some embodiments, the authorization request message may be sent to issuer computer 909 via the payment processing network. Upon receiving the authorization request message, issuer computer 909 may determine whether the transaction can be authorized based on information included in the authorization request message.

At step 7, issuer computer 909 may generate an authorization response message and send the authorization response message to acquirer computer 907. Issuer computer 909 may include an indication of whether the transaction was authorized in the authorization response message. In some embodiments, issuer computer 909 may sent the authorization response message to acquirer computer 907 via the payment processing network.

At step 8, acquirer computer 907 may forward the authorization response message to access device 905. Access device 905 may then determine that the transaction was authorized and may display confirmation of transaction completion on a display of access device 905. In some embodiments, the mobile application of mobile device 902 may receive a notification from issuer computer 909 that the transaction was authorized. The user of mobile device 902 may then receive goods or services from the resource providing entity (e.g., merchant).

At a later time, the transaction may then be settled between issuer computer 909 and acquirer computer 907. The account of the resource providing entity (e.g., merchant) may be credited and the account of the user may be debited for the transaction amount. Accordingly, embodiments of the invention enable the payment authorization to be authorized and settled by the payment processing network, acquirer computer 907, issuer computer 909 in a way that is transparent to existing payment terminal software and backend processing networks.

II. Exemplary Computer System

Figure 10:
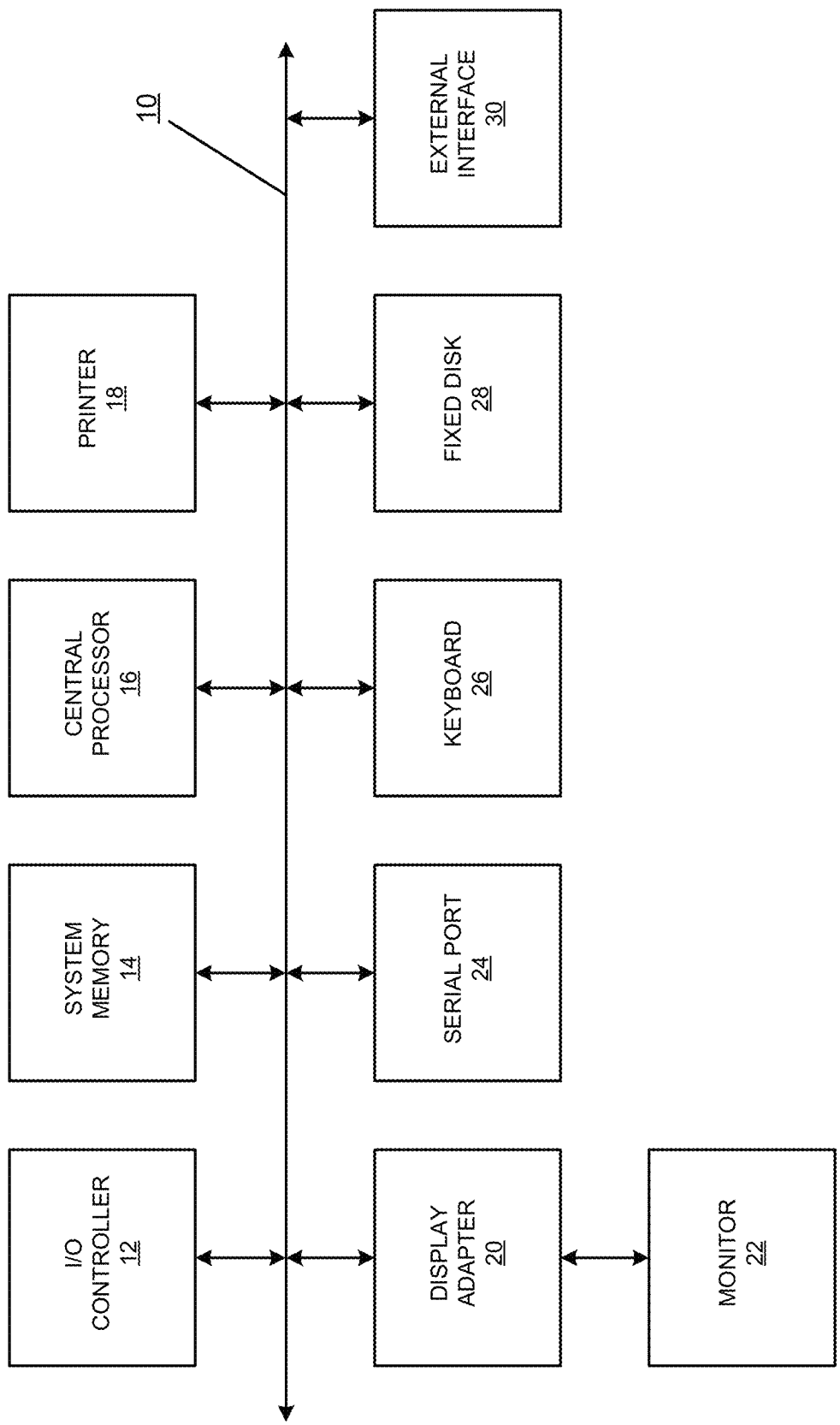
FIG. 10 is a block diagram for an exemplary computer system.

FIG. 10 is a high level block diagram of a computer system that may be used to implement any of the entities or components described above. The subsystems shown in FIG. 10 are interconnected via a system bus 10. Additional subsystems such as a printer 18, keyboard 26, fixed disk 28 (or other memory comprising computer readable media), monitor 22, which is coupled to display adapter 20, and others are shown. Peripherals and input/output (I/O) devices, which couple to I/O controller 12 (which can be a processor or other suitable controller), can be connected to the computer system by any number of means known in the art, such as serial port 24. For example, serial port 24 or external interface 30 can be used to connect the computer apparatus to a wide area network such as the Internet, a mouse input device, or a scanner. The interconnection via system bus allows the central processor 16 to communicate with each subsystem and to control the execution of instructions from system memory 14 or the fixed disk 28, as well as the exchange of information between subsystems. The system memory 14 and/or the fixed disk 28 may embody a computer readable medium. In some embodiments, the monitor 22 may be a touch sensitive display screen.

A computer system can include a plurality of the same components or subsystems, e.g., connected together by external interface 30 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A bridge device configured to communicatively couple a mobile device and an existing access device attached to the bridge device during a transaction, the bridge device comprising:
   a processor;
   an antenna coupled to the processor;
   a computer-readable medium coupled to the processor, the computer-readable medium comprising code, executable by the processor, for performing a method comprising:
   establishing a wireless connection with the mobile device of a user conducting the transaction, wherein the bridge device is configured to be removably inserted in the existing access device and wherein the bridge devices comprises one or more connectors configured to communicate with the mobile device using one or more of a plurality of wireless protocols supported by the mobile device,
   wherein the bridge device is configured to communicate with one or more components of the access device,
   wherein the bridge device enables peer-to-peer communication;
   determining one or more available communication components of the access device, wherein the access device is configured to communicate across a plurality of communication components, wherein the one or more available communication components are registered in a priority order by the bridge device;
   activating the one or more available communication components of the access device;
   relaying communications to the access device via the activated one or more available communication components of the access device;
   notifying, over the wireless connection, the mobile device of the one or more available communication components;
   receiving, from the mobile device over the wireless connection, a response including a selection of a first communication component from the one or more available communication components;
   communicating the selection of the first communication component to the access device;
   sending, to the mobile device over the wireless connection, a request to initiate the transaction using the first communication component;
   receiving, from the mobile device over the wireless connection, a message including transaction data for conducting the transaction using the first communication component, wherein the message is sent by the mobile device over a first wireless connection protocol;
   converting the message in real time, including the transaction data for conducting the transaction using the first communication component, that is sent over the first wireless connection protocol, to data that is compatible with the first communication component, selected by the mobile device; and
   providing the converted message including the transaction data to the access device, wherein the access device transmits an authorization request including the transaction data to a server computer for authorization so as to enable communication between the mobile device and the access device.

2. The bridge device of claim 1, wherein the bridge device further comprises a connector for attaching the bridge device to the access device.

3. The bridge device of claim 2, wherein the connector comprises at least one of a magnetic component connector, a contact component connector, and a contactless component connector for connecting to the communication components of the access device.

4. The bridge device of claim 1, wherein the one or more available communication components include a magnetic stripe component, a contact component, and a contactless component.

5. The bridge device of claim 1, wherein the wireless connection is a local area wireless network connection or a short-range wireless connection.

6. The bridge device of claim 1, the method further comprising:
   detecting that the mobile device is in range of the bridge device; and
   receiving, from the mobile device, an indication that the mobile device is capable of conducting transaction with the bridge device.

7. The bridge device of claim 6, wherein the indication shows that the mobile device is running a bridge device mobile application.

8. The bridge device of claim 1, the method further comprising:
   receiving a request from the mobile device to utilize a second communication component instead of the first communication component for the transaction;
   sending a notification to the access device to switch communication components; and
   conducting the transaction using the second communication component.

9. The bridge device of claim 1, the method further comprising:
detecting that the first communication component of the access device is activated before initiating the transaction.

10. A method performed by a bridge device configured to communicatively couple a mobile device and an existing access device attached to the bridge device during a transaction, the method comprising:
establishing a wireless connection with the mobile device of a user conducting the transaction, wherein the bridge device is configured to be removably inserted in the existing access device and wherein the bridge device comprises one or more connectors configured to communicate with the mobile device using one or more of a plurality of wireless protocols supported by the mobile device;
wherein the bridge device is configured to communicate with one or more components of the access device,
wherein the bridge device enables peer-to-peer communication;
determining one or more available communication components of the access device, wherein the access device is configured to communicate across a plurality of communication components, wherein the one or more available communication components are registered in a priority order by the bridge device;
activating the one or more available communication components of the access device:
relaying communications to the access device via the activated one or more available communication components of the access device;
notifying, over the wireless connection, the mobile device of the one or more available communication components;
receiving, from the mobile device over the wireless connection, a response including a selection of a first communication component from the one or more available communication components, wherein the response is sent by the mobile device over a first wireless protocol;
communicating the selection to the access device;
sending, to the mobile device over the wireless connection, a request to initiate the transaction using the first communication component;
receiving, from the mobile device over the wireless connection, a message including transaction data for conducting the transaction using the first communication component;
converting the message in real time including the transaction data for conducting the transaction using the first communication component, that is sent over the first wireless protocol, to data that is compatible with the first communication component selected by the mobile device; and
providing the converted message including the transaction data to the access device, wherein the access device transmits an authorization request including the transaction data to a server computer for authorization so as to enable communication between the mobile device and the access device.

11. The method of claim 10, wherein the bridge device further comprises a connector for attaching the bridge device to the access device.

12. The method of claim 11, wherein the connector comprises at least one of a magnetic component connector, a contact component connector, and a contactless component connector for connecting to the communication components of the access device.

13. The method of claim 10, wherein the one or more available communication components include a magnetic stripe component, a contact component, and a contactless component.

14. The method of claim 10, wherein the wireless connection is a local area wireless network connection or a short-range wireless connection.

15. The method of claim 10, further comprising:
detecting that the mobile device is in range of the bridge device; and
receiving, from the mobile device, an indication that the mobile device is capable of conducting transaction with the bridge device.

16. The method of claim 15, wherein the indication shows that the mobile device is running a bridge device mobile application.

17. The method of claim 10, further comprising:
receiving a request from the mobile device to utilize a second communication component instead of the first communication component for the transaction;
sending a notification to the access device to switch communication components; and
conducting the transaction using the second communication component.

18. The method of claim 10, further comprising:
detecting that the first communication component of the access device is activated before initiating the transaction.

19. The bridge device according to claim 1, wherein the bridge device is configured to activate one of the plurality of communication components of the access device and relay communication to the access device through an activated one of the plurality of communication components.

20. The bridge device according to claim 1, wherein the access device is a point of sale terminal comprising a processor and a memory, and wherein the access device is configured to interact with the mobile device via the bridge device.

21. The bridge device according to claim 1, wherein the mobile device comprises a processor and a memory.

22. The bridge device according to claim 1, wherein the bridge device is configured to support wireless protocols that are not supported by the access device.

23. The bridge device according to claim 1, wherein the bridge device is configured to communicate with the mobile device via a Bluetooth communication protocol, a WiFi communication protocol, or an NFC peer-to-peer communication protocol.

24. The bridge device according to claim 1, the method further comprising, before establishing the wireless connection with the mobile device, inserting the bridge device into an existing slot of the access device that is structured to receive a card.

* * * * *